US008897278B2

(12) United States Patent
Kimura

(10) Patent No.: US 8,897,278 B2
(45) Date of Patent: Nov. 25, 2014

(54) OFDM RECEIVING DEVICE AND OFDM RECEIVING METHOD

(75) Inventor: Tomohiro Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 1096 days.

(21) Appl. No.: 12/529,783

(22) PCT Filed: Mar. 17, 2008

(86) PCT No.: PCT/JP2008/000611
§ 371 (c)(1),
(2), (4) Date: Sep. 3, 2009

(87) PCT Pub. No.: WO2008/126356
PCT Pub. Date: Oct. 23, 2008

(65) Prior Publication Data
US 2010/0118849 A1    May 13, 2010

(30) Foreign Application Priority Data

Mar. 29, 2007   (JP) ................................ 2007-087606

(51) Int. Cl.
*H04L 27/26* (2006.01)
*H04L 7/04* (2006.01)

(52) U.S. Cl.
CPC ............ *H04L 27/2676* (2013.01); *H04L 7/042* (2013.01); *H04L 27/2655* (2013.01); *H04L 27/2691* (2013.01)
USPC ......................................... 370/338; 375/260

(58) Field of Classification Search
CPC .......... H03H 17/0635; H03H 17/0664; H03H 17/0427; H03H 17/045
USPC ........... 370/310, 338; 327/551; 375/267, 347, 375/346; 708/313
See application file for complete search history.

(56) References Cited

U.S. PATENT DOCUMENTS

| 5,079,734 A | * | 1/1992 | Riley | 708/313 |
| 2003/0072397 A1 | * | 4/2003 | Kim et al. | 375/347 |

(Continued)

FOREIGN PATENT DOCUMENTS

| JP | 2000-332727 | 11/2000 |
| JP | 2002-290371 | 10/2002 |
| JP | 2003-51802 | 2/2003 |
| JP | 2004-179816 | 6/2004 |
| JP | 2006-174218 | 6/2006 |

OTHER PUBLICATIONS

International Search Report issued Jun. 17, 2008 in International (PCT) Application No. PCT/JP2008/000611, filed Mar. 17, 2008.

(Continued)

*Primary Examiner* — Joseph Bednash
(74) *Attorney, Agent, or Firm* — Wenderoth, Lind & Ponack, L.L.P.

(57) ABSTRACT

An OFDM receiver receives an OFDM signal. The OFDM signal is composed of a useful symbol period for transmitting a signal relating to data and a guard interval period for transmitting a signal that is the same as part of the signal transmitted in the useful symbol period. An interference wave cancel circuit cancels a narrow-band interference wave component relating to a narrow-band interference wave from the OFDM signal, and outputs the OFDM signal from which the narrow-band interference wave component has been canceled, as a cancel signal. The correlation detection circuit calculates a correlation between a cancel signal output from the interference wave cancel circuit and a cancel signal which has been delayed by the useful symbol period delay circuit by the useful symbol period.

10 Claims, 13 Drawing Sheets

(56) References Cited

U.S. PATENT DOCUMENTS

| 2004/0056785 | A1* | 3/2004 | Webster et al. | 341/61 |
| 2005/0031061 | A1* | 2/2005 | Ojard et al. | 375/346 |
| 2005/0122920 | A1* | 6/2005 | Liu | 370/310 |
| 2007/0057718 | A1* | 3/2007 | Coulson | 327/551 |
| 2008/0187065 | A1* | 8/2008 | Chang et al. | 375/267 |
| 2010/0118849 | A1* | 5/2010 | Kimura | 370/338 |

OTHER PUBLICATIONS

Extended European Search Report mailed Sep. 10, 2012 in corresponding European Patent Application No. 08720496.2.

Aghajeri S. et al., "Synchronization in OFDM Powerline Communication Systems in Presence of Narrowband Interferences" *Siginal Processing and Its Applications, Seventh International Symposium*, IEEE, vol. 2, 2003, pp. 359-362.

Kai, Shi et al., "Impacts of Narrowband Interference on OFDM-UWB Receivers: Analysis and Mitigation", *IEEE Transactions on Signal Processing*, vol. 55, No. 3, Mar. 2007, pp. 1118-1128.

IEEE Standard for Information technology—Telecommunications and information exchange between systems—Local and metropolitan area networks—Specific Requirements, Part 11: Wireless LAN Medium Access Control (MAC) and Physical Layer (PHY) Specifications, IEEE Std 802.11™—2007 (Revision of IEEE Std 802.11-1999).

* cited by examiner

OFDM RECEIVING DEVICE AND OFDM RECEIVING METHOD

TECHNICAL FIELD

The present invention relates to an art for reducing deterioration of reception quality caused by a narrow-band interference wave in the OFDM (Orthogonal Frequency Division Multiplexing) transmission system.

BACKGROUND ART

The OFDM transmission system is adopted for the digital television broadcast, the wireless LAN (Local Area Network), and the like. The OFDM transmission system is a kind of the multi-carrier transmission system. According to the OFDM transmission system, pieces of digital data are respectively assigned to a plurality of carriers, the carriers are modulated with the pieces of digital data, and then the modulated carriers are multiplexed and transmitted.

Since the OFDM transmission system can extend a time period of each modulation symbol by using a plurality of carriers, the OFDM transmission system is known as transmission system resistant to the multipath interruption.

Also, according to the OFDM transmission system, a signal to be transmitted is generally composed of a period necessary for actually transmitting a signal that relates to data, which is called a useful symbol period, and a redundant period for transmitting a signal that is the same as part of the signal transmitted in the useful symbol period, which is called a guard interval period. The signal transmitted in the guard interval period is also called a cyclic prefix, and prevents, against a delay wave due to the multipath propagation, the inter-symbol interference, and the inter-carrier interference by maintaining the inter-carrier orthogonality.

Note that a signal transmitted in accordance with the OFDM transmission system is called "OFDM signal", and the OFDM signal includes a signal transmitted in a useful symbol period and a signal transmitted in a guard interval period.

Conventionally, there have been known a frequency synchronization method and a symbol synchronization method. According to these methods, by utilizing that a signal transmitted in a guard interval period and part of a signal transmitted in a useful symbol period have the same signal waveform, frequency synchronization of carrier frequency and symbol synchronization for identifying a symbol are performed based on a correlation between the signal transmitted in the guard interval period and the part of the signal transmitted in the useful symbol period. However, if an OFDM signal on which a narrow-band interference wave has been superposed is received, the correlation is influenced by the narrow-band interference wave, and there occurs an error in the frequency synchronization and the symbol synchronization. This is due to the following. The narrow-band interference wave has a strong time correlation. When a correlation is calculated between a signal transmitted in a guard interval period and part of a signal transmitted in a useful symbol period, the correlation of the narrow-band interference wave is superposed on the correlation between the signals, as an error in additivity.

Note that the narrow-band interference wave indicates an interference wave having a frequency bandwidth narrower than a frequency bandwidth of a signal transmitted in accordance with the OFDM transmission system.

The Patent Document 1 discloses an OFDM receiver that solves the above problem. The following describes the conventional OFDM receiver disclosed in the Patent Document 1 with reference to the drawing.

According to a conventional OFDM receiver 100 shown in FIG. 11, OFDM signals received by an antenna 111 are input to a tuner 112. The tuner 112 selects an OFDM signal of a desired channel among the OFDM signals, and then converts the selected OFDM signal into an OFDM signal of an IF (Intermediate Frequency) band. The tuner 112 outputs the OFDM signal of the IF band to an analog to digital convertor (hereinafter, "A/D convertor") 113. The A/D convertor 113 converts the OFDM signal from an analog signal into a digital signal, and outputs the digital OFDM signal to an IQ demodulation circuit 114, which is a quadrature detector circuit. The IQ demodulation circuit 114 performs quasi-synchronous quadrature detection on the digital OFDM signal so as to be converted into a complex baseband signal. Note that the frequency control circuit 124 performs control such that the detection frequency of the detection signal used by the IQ demodulation circuit 114 for performing quasi-synchronous quadrature detection synchronizes with a frequency of an OFDM signal input to the IQ demodulation circuit 114.

The IQ demodulation circuit 114 outputs the complex baseband signal (hereinafter, "IQ demodulated signal") to an FFT circuit 115. The FFT circuit 115 detects a useful symbol period of the IQ demodulated signal based on a later-described detection signal input from a timing detection circuit 120. Then, the FFT circuit 115 performs an FFT (Fast Fourier Transform) calculation on the IQ demodulated signal corresponding to the detected useful symbol period, and converts the IQ demodulated signal from data on a time axis into data on a frequency axis. A demodulation circuit 116 demodulates the data obtained as a result of the FFT calculation performed by the FFT circuit 115, and an error correction circuit 117 performs error correction processing on the demodulated data.

Also, the complex baseband signal (IQ demodulated signal) output from the IQ demodulation circuit 114 is input to a correlation detection circuit 118. The output IQ demodulated signal is delayed by a useful symbol period delay circuit 119 by a useful symbol period, and then is output to the correlation detection circuit 118. The correlation detection circuit 118 detects a correlation of a guard interval period between the IQ demodulated signal and the IQ demodulated signal which has been delayed by the useful symbol period (hereinafter, "useful symbol period delay signal"). Here, the correlation detection operations performed by the correlation detection circuit 118 are described with reference to FIG. 12(a) to FIG. 12(d).

FIG. 12(a) shows an IQ demodulated signal output from the IQ demodulation circuit 114, and FIG. 12(b) shows a useful symbol period delay signal output from the useful symbol period delay circuit 119. Note that one symbol period of the IQ demodulated signal is composed of a guard interval period and a useful symbol period for transmitting a signal relating to data. The guard interval period has a copy of the latter part of the useful symbol period.

The correlation detection circuit 118 multiplies an IQ demodulated signal by a complex conjugate of a useful symbol period delay signal to calculate an I component and a Q component of a correlation value of the IQ demodulated signal and the useful symbol period delay signal. The correlation value calculated by the correlation detection circuit 118 is greater in a guard interval period of the useful symbol period delay signal whose IQ demodulated signal and useful symbol period delay signal match each other, as shown in FIG. 12(c). Note that FIG. 12(c) shows an I component of a correlation value, and does not show a Q component of the correlation value.

Note that the "I component" and the "Q component" respectively indicate an "inphase component" and a "quadrature component" in the present Specification.

The correlation detection circuit 118 calculates a moving average of each of the I component and the Q component of the correlation value using a width of a guard interval period, and outputs a correlation signal whose I component and Q component are respectively I component and Q component of the moving average values. As shown in FIG. 12(d), a peak of the correlation signal is at a head of a useful symbol period of a useful symbol period delay signal. FIG. 12(d) shows the I component of the correlation signal, and the Q component of the correlation signal is not shown in the figure. Note that if there is no frequency error between a frequency of an OFDM signal input to the IQ demodulation circuit 114 and a detection frequency of a detection signal to be used by the IQ demodulation circuit 114 for performing quasi-synchronous quadrature detection, the I component of the correlation signal has a peak, and the Q component of the correlation signal is substantially 0.

The timing detection circuit 120 detects a timing showing a head of a useful symbol period of an IQ demodulated signal based on an input correlation signal, and outputs a detection signal based on a result of the detection to the FFT circuit 115.

An offset detection circuit 121 and a correction circuit 122 cancel a component caused by a narrow-band interference wave from an I component and a Q component of a correlation signal of a guard interval period of a useful symbol period delay signal to correct the I component and the Q component of the correlation signal, as described later.

A $\tan^{-1}$ circuit 123 detects a guard interval period of the useful symbol period delay signal based on the detection signal input from the timing detection circuit 120, and calculates a phase angle of the correlation signal using the I component and the Q component of the correlation signal of the detected guard interval period. Then, the frequency control circuit 124 controls a detection frequency of a detection signal to be used by the IQ demodulation circuit 114 for performing quasi-synchronous quadrature detection so as to synchronize frequencies, based on an error signal indicating a value of the phase angle of the correlation signal input from the $\tan^{-1}$ circuit 123.

The following describes the operations of the OFDM receiver 100 for receiving an OFDM signal on which a CW (Continuous Wave) interference wave that is a kind of interference wave is superposed, with reference to FIG. 13(a) to FIG. 13(g).

FIG. 13(a) shows an IQ demodulated signal output from the IQ demodulation circuit 114. FIG. 13(b) shows a useful symbol period delay signal output from the useful symbol period delay circuit 119. Note that the IQ demodulated signal shown in FIG. 13(a) and the useful symbol period delay signal shown in FIG. 13(b) are each a signal on which a CW interference wave component relating to a CW interference wave is superposed.

The correlation detection circuit 118 calculates a correlation value between the IQ demodulated signal and the useful symbol period delay signal. The correlation value calculated by the correlation detection circuit 118 is a value different by a certain amount from a correlation value relating to an OFDM signal on which no CW interference wave is superposed, as shown in FIG. 13(c). Note that FIG. 13(c) shows an I component of a correlation value, and a Q component of the correlation value is not shown in the figure.

The correlation detection circuit 118 calculates a moving average of each of the I component and the Q component of the correlation value using a width of a guard interval period, and outputs a correlation signal whose I component and Q component are respectively an I component and a Q component of the moving average values. The correlation signal output from the correlation detection circuit 118 is a signal different by a certain amount from a correlation signal relating to an OFDM signal on which no CW interference wave is superposed, as shown in FIG. 13(d). Note that FIG. 13(d) shows an I component of a correlation value, and a Q component of the correlation value is not shown in the figure.

The timing detection circuit 118 inputs a timing signal shown in FIG. 13(e) indicating a predetermined period T other than the guard interval period to the offset detection circuit 121. The offset detection circuit 121 calculates an average value in the predetermined period T of each of the I component and the Q component of the correlation signal input from the correlation detection circuit 118 (hereinafter, "offset amount"). Then, the offset detection circuit 121 outputs a signal as shown in FIG. 13(f) indicating an offset amount of each of the I component and the Q component to the correction circuit 122.

Based on a timing signal shown in FIG. 13(g), the correction circuit 122 subtracts, from the I component and the Q component of the correlation signal input from the correlation detection circuit 118 corresponding to the guard interval period of the useful symbol period delay signal, the offset amount of each of the I component and the Q component input from the offset detection circuit 121, and outputs a value obtained as a result of the subtraction of each of the I component and the Q component of the correlation signal to the $\tan^{-1}$ circuit 123.

[Patent Document 1] Japanese Laid-Open Patent Application Publication No. 2002-290371

DISCLOSURE OF THE INVENTION

Problems the Invention is Going to Solve

Basically, a correlation signal relating to an OFDM signal on which an interference wave corresponding to a guard interval period of a useful symbol period delay signal is superposed should be corrected, using a correlation signal relating to an interference wave corresponding to the guard interval period. However, the correction circuit 122 performs the correction using a correlation signal relating to an interference wave corresponding to the predetermined period T other than the guard interval period.

Then, when an amplitude and a phase of the interference wave vary over time, a correlation signal relating to the interference wave varies over time. The correlation signal relating to the interference wave corresponding to the guard interval period of the useful symbol period delay signal does not match the correlation signal relating to the interference wave corresponding to the above predetermined period T.

Also, the correlation signal calculated by the correlation detection circuit 118 relates to a correlation between an IQ demodulated signal and a useful symbol period delay signal obtained by delaying the IQ demodulated signal by a useful symbol period. A time difference between the IQ demodulated signal and the useful symbol period delay signal is comparatively large. Accordingly, if the amplitude and the phase of the interference wave vary over time, the correlation signal relating to the interference wave greatly varies over time and impairs its constancy.

Therefore, the correction circuit 122 does not appropriately correct the correlation signal relating to the OFDM signal on which the interference wave is superposed and corresponding to the guard interval period.

Furthermore, if a reception power of the interference wave is high, a component of the correlation signal relating to the interference wave of the correlation signal calculated by the correlation detection circuit 118 is high. There is a problem that a timing detected by the timing detection circuit 120 is an error and this causes error operations of the whole OFDM receiver 100.

In view of the above problem, the present invention aims to provide an OFDM receiver and an OFDM receiving method that are capable of, even if receiving an OFDM signal on which a narrow-band interference wave is superposed, performing reception operations of the OFDM signal more stably.

Means to Solve the Problems

In order to achieve the above aims, the present invention provides an OFDM (Orthogonal Frequency Division Multiplexing) receiver for receiving an OFDM signal composed of a useful symbol period for transmitting a signal relating to data and a guard interval period for transmitting a signal that is the same as part of the signal transmitted in the useful symbol period, the OFDM receiver comprising: an interference wave cancel unit operable to cancel a narrow-band interference wave component relating to a narrow-band interference wave from an input OFDM signal, and output the OFDM signal from which the narrow-band interference wave component has been cancelled, as a cancel signal; a delay unit operable to delay the cancel signal output from the interference wave cancel unit by the useful symbol period, and output the delayed cancel signal, as a delay signal; a correlation detection unit operable to calculate a correlation between the cancel signal output from the interference wave cancel unit and the delay signal output from the delay unit, and output a correlation signal relating to the calculated correlation; and a synchronization unit operable to perform synchronization processing based on the correlation signal output from the correlation detection unit.

The present invention provides an OFDM (Orthogonal Frequency Division Multiplexing) receiving method of receiving an OFDM signal composed of a useful symbol period for transmitting a signal relating to data and a guard interval period for transmitting a signal that is the same as part of the signal transmitted in the useful symbol period, the OFDM receiving method comprising: an interference wave cancel step of canceling a narrow-band interference wave component relating to a narrow-band interference wave from an input OFDM signal, and outputting the OFDM signal from which the narrow-band interference wave component has been cancelled, as a cancel signal; a delay step of delaying the cancel signal output in the interference wave cancel step by the useful symbol period, and output the delayed cancel signal, as a delay signal; a correlation detection step of calculating a correlation between the cancel signal output in the interference wave cancel step and the delay signal output from the delay step, and outputting a correlation signal relating to the calculated correlation; and a synchronization step of performing synchronization processing based on the correlation signal output in the correlation detection step.

The synchronization processing includes processing relating to frequency synchronization and processing relating to symbol synchronization, for example.

Effect of the Invention

According to the OFDM receiver and OFDM receiving method, a narrow-band interference wave component relating to a narrow-band interference wave is canceled from an OFDM signal. Then, a correlation is calculated between a cancel signal obtained as a result of the cancellation of the narrow-band interference wave component relating to the narrow-band interference wave and a delay signal obtained as a result of delay of the cancel signal by a useful symbol period.

Accordingly, a correlation signal relating to the correlation between the cancel signal and the delay signal includes few components relating to the narrow-band interference wave. It is possible to accurately perform synchronization processing using the correlation signal. As a result, even if receiving an OFDM signal on which a narrow-band interference wave is superposed, the above OFDM receiver can perform reception operations of the OFDM signal more stably.

In the above OFDM receiver, the interference wave cancel unit may include: an interference wave cancel filter subunit that has a variable filter coefficient and operable to filter the input OFDM signal and output the filtered OFDM signal, as the cancel signal; an autocorrelation subunit operable to calculate the autocorrelation of the input OFDM signal; and a coefficient control subunit operable to calculate a control value of the filter coefficient of the interference wave cancel filter subunit based on the autocorrelation calculated by the autocorrelation subunit, and controls the filter coefficient based on the calculated control value.

In the above OFDM receiver, the interference wave cancel unit may include: an interference wave cancel filter subunit that has a variable filter coefficient and operable to filter the input OFDM signal and output the filtered OFDM signal, as the cancel signal; a cross-correlation subunit operable to calculate the cross-correlation between the input OFDM signal and the cancel signal output from the interference wave cancel filter subunit; and a coefficient control subunit operable to calculate a control value of the filter coefficient of the interference wave cancel filter subunit based on the cross-correlation calculated by the cross-correlation subunit, and controls the filter coefficient based on the calculated control value.

With the above structures, it is possible to realize the interference wave cancel unit having a simple structure.

In the above OFDM receiver, the interference wave cancel unit may further include a downsampling subunit operable to resample the input OFDM signal by decreasing a sampling frequency of the input OFDM signal, and output the resampled OFDM signal to the interference wave cancel filter subunit and the autocorrelation subunit, as a resampled signal, the interference wave cancel filter subunit performs processing relating to the filtering on the resampled signal, and the autocorrelation subunit performs processing for calculating the autocorrelation with use of the resampled signal.

In the above OFDM receiver, the interference wave cancel unit may further include a downsampling subunit operable to resample the input OFDM signal by decreasing a sampling frequency of the input OFDM signal, and output the resampled OFDM signal to the interference wave cancel filter subunit and the cross-correlation subunit, as a resampled signal, the interference wave cancel filter subunit performs processing relating to the filtering on the resampled signal, and the cross-correlation subunit performs processing for calculating the cross-correlation with use of the resampled signal and the cancel signal.

With the above structures, it is possible to suppress cancellation of a component relating to a transmitted OFDM signal from a received OFDM signal, and efficiently cancel a narrow-band interference wave component relating to a narrow-band interference wave.

In the above OFDM receiver, the downsampling subunit may perform the resampling such that the sampling frequency of the resampled signal is no more than a frequency bandwidth of the input OFDM signal.

With the above structure, when a narrow-band interference wave is cancelled by the interference wave cancel filter subunit, the autocorrelation subunit, and the coefficient control subunit, or when a narrow-band interference wave is cancelled by the interference wave cancel filter subunit, the cross-correlation subunit, and the coefficient control subunit, it is possible to avoid treating a component relating to an OFDM signal transmitted from a transmitter as a narrow-band interference wave.

In the above OFDM receiver, the downsampling subunit may include: a band limit filter subunit operable to perform band limitation on the input OFDM signal; and a thinning subunit operable to thin a sample included in the OFDM signal on which the band limitation has been performed by the band limit filter subunit, and output the OFDM signal from which the sample has been thinned, as the resampled signal.

With the above structure, it is possible to realize the downsampling unit having a simple structure.

In the above OFDM receiver, band-pass characteristics of the band limit filter subunit may be determined such that a cutoff frequency of the band-pass characteristics is equal to a nyquist frequency of sampling frequencies of the resampled signal with respect to root nyquist characteristics.

With the above structure, when the aliasing distortion caused by thinning of a sample of an OFDM signal performed by the thinning subunit is considered, it is possible to maintain a constant gain in a frequency bandwidth of a resampled signal output from the thinning subunit.

In the above OFDM receiver, the thinning subunit may perform the thinning such that the sampling frequency of the resampled signal is no more than a value of a frequency bandwidth of the input OFDM signal.

With the above structure, when a narrow-band interference wave is cancelled by the interference wave cancel filter subunit, the autocorrelation subunit, and the coefficient control subunit, or when a narrow-band interference wave is cancelled by the interference wave cancel filter subunit, the cross-correlation subunit, and the coefficient control subunit, it is possible to avoid treating a component relating to an OFDM signal transmitted from a transmitter as a narrow-band interference wave.

DESCRIPTION OF CHARACTERS

Figure 1:
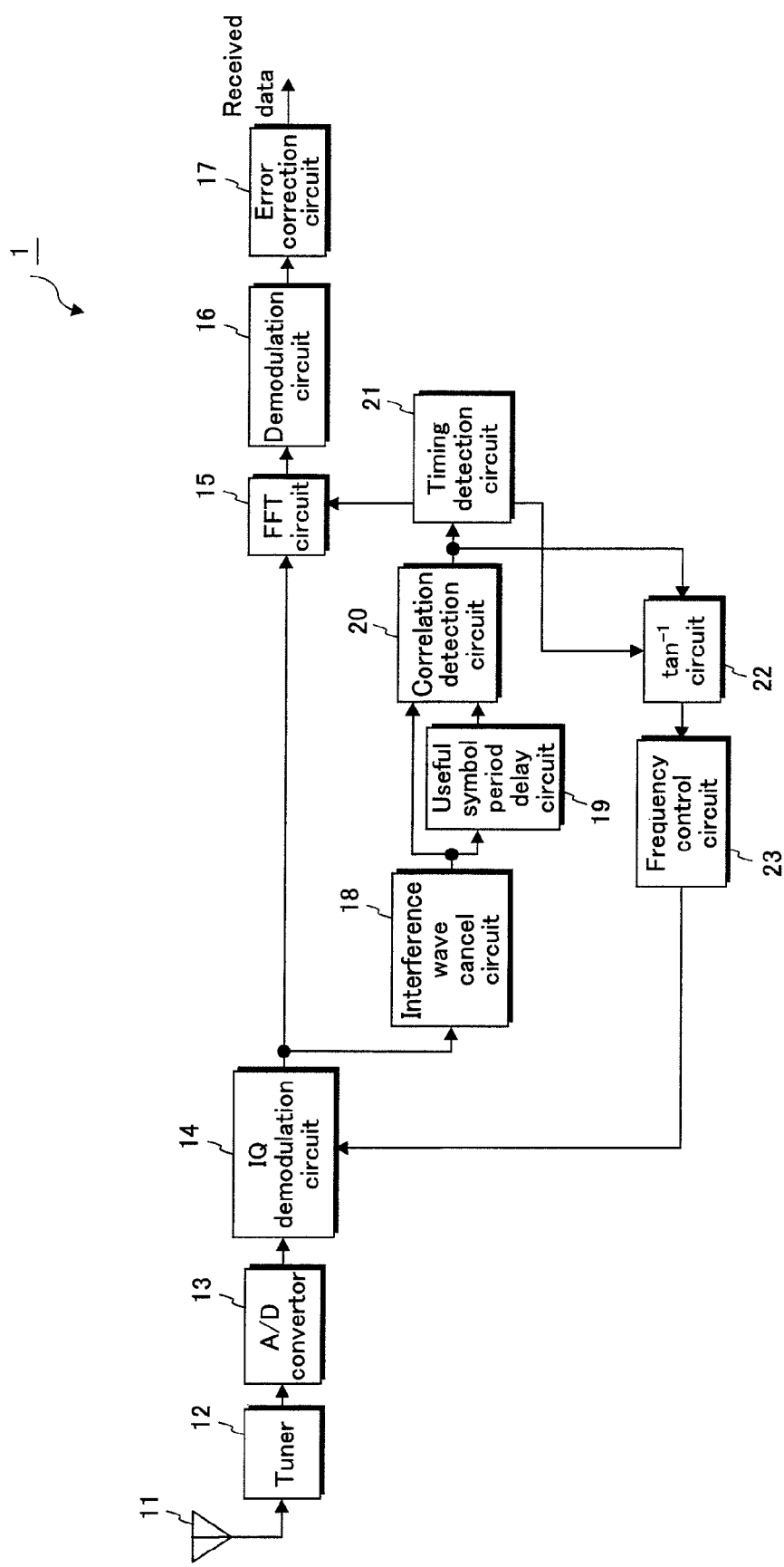
FIG. 1 shows the structure of an OFDM receiver according to a first embodiment.

1: OFDM receiver
11: antenna
12: tuner
13: A/D convertor
14: IQ demodulation circuit
15: FFT circuit
16: demodulation circuit
17: error correction circuit
18 and 18a: interference wave cancel circuit
19: useful symbol period delay circuit
20: correlation detection circuit
21: timing detection circuit
22: $\tan^{-1}$ circuit
23: frequency control circuit
31: downsampling circuit
32: interference wave cancel filter
33: autocorrelation circuit
33a: cross-correlation circuit
34 and 34a: coefficient control circuit
51: filter
52: thinning circuit
71a, 71b, and 71c: delay circuit
72a, 72b, and 72c: multiplication circuit
73: addition circuit

BEST MODE FOR CARRYING OUT THE INVENTION

First Embodiment

The following describes a first embodiment of the present invention with reference to the drawings.

<Structure of OFDM Receiver>

Firstly, the structure of an OFDM receiver 1 according to the first embodiment is described with reference to FIG. 1. FIG. 1 shows the structure of the OFDM receiver 1. Note that each symbol of an OFDM signal received by the OFDM receiver 1 includes a useful symbol period for actually transmitting a signal relating to data and a guard interval period for transmitting a signal that is the same with a latter part of the signal transmitted in the useful symbol period. The transmission of the signal in the guard interval period is prior to the transmission of the signal in the useful symbol period.

The OFDM receiver 1 includes an antenna 11, a tuner 12, an A/D convertor 13, an IQ demodulation circuit 14, an FFT circuit 15, a demodulation circuit 16, an error correction circuit 17, an interference wave cancel circuit 18, a useful symbol period delay circuit 19, a correlation detection circuit 20, a timing detection circuit 21, a $\tan^{-1}$ circuit 22, and a frequency control circuit 23.

Although described in detail later, according to the OFDM receiver 1 shown in FIG. 1, the interference wave cancel circuit 18 cancels, from a signal output from the IQ demodulation circuit 14, a narrow-band interference wave component relating to a narrow-band interference wave. Then, the correlation detection circuit 20 performs a correlation calculation using the signal from which the narrow-band interference wave has been canceled by the interference wave cancel circuit 18.

Tuner 12

OFDM signals received by the antenna 11 are input to the tuner 12. The tuner 12 selects an OFDM signal of a desired channel among the input OFDM signals, converts the selected OFDM signal into an OFDM signal of an IF band, and outputs the OFDM signal of the IF band to the A/D convertor 13.

A/D Convertor 13

The A/D convertor 13 converts an OFDM signal input from the tuner 12 using a predetermined sampling frequency, from an analog signal into a digital signal, and outputs the OFDM signal that has been converted into the digital signal to the IQ demodulation circuit 14. A value greater than a value of a frequency bandwidth of an OFDM signal is generally used as a value of a sampling frequency.

IQ Demodulation Circuit 14

A quadrature detector circuit is used as the IQ demodulation circuit 14.

A control signal, which is described later, is input to the IQ demodulation circuit 14 from the frequency control circuit 23. The IQ demodulation circuit 14 adjusts a detection frequency of a detection signal to be used for performing quasi-synchronous quadrature detection so as to synchronize frequencies, based on the input control signal.

The IQ demodulation circuit 14 performs quasi-synchronous quadrature detection on the OFDM signal input from the A/D convertor 13, which has been converted into the digital signal, using the detection signal, and outputs a complex baseband signal (IQ demodulated signal) obtained as a result of the quasi-synchronous quadrature detection to the FFT circuit 15 and the interference wave cancel circuit 18.

FFT Circuit 15

The FFT circuit 15 detects a useful symbol period of the IQ demodulated signal input from the IQ demodulation circuit 14, based on a detection signal which is described later input from the timing detection circuit 21. Then, the FFT circuit 15 performs an FFT calculation on the IQ demodulated signal corresponding to the detected useful symbol period, and converts the IQ demodulated signal from data on a time axis to data on a frequency axis, and outputs a plurality of pieces of data respectively relating to a plurality of carriers obtained as a result of the conversion to the demodulation circuit 16.

Demodulation Circuit 16

The demodulation circuit 16 performs demodulation processing on the pieces of data respectively relating to the carriers input from the FFT circuit 15, and outputs data assigned to each of the carries obtained as a result of the demodulation processing (hereinafter, "demodulated data") to the error correction circuit 17.

Error Correction Circuit 17

The error correction circuit 17 performs error correction processing on demodulated data input from the demodulation circuit 16, and outputs received data whose error has been corrected during transmission.

Interference Wave Cancel Circuit 18

The interference wave cancel circuit 18 estimates a narrow-band interference wave based on adaptive signal processing, and cancels the estimated narrow-band interference wave.

The interference wave cancel circuit 18 according to the first embodiment decreases a sampling frequency of an IQ demodulated signal input from the IQ demodulation circuit 14, and adaptively cancels a narrow-band interference wave component relating to a narrow-band interference wave from the signal obtained as a result of the decrease of the sampling frequency. Then, the interference wave cancel circuit 18 outputs the signal obtained as a result of the adaptive cancellation of the narrow-band interference wave component to the useful symbol period delay circuit 19 and the correlation detection circuit 20. Hereinafter, a signal obtained as a result of adaptive cancellation of a narrow-band interference wave component and output from the interference wave cancel circuit 18 is referred to as "cancel signal".

The structure and operations of the interference wave cancel circuit 18 are described later in detail with reference to FIG. 2 to FIG. 9.

Useful Symbol Period Delay Circuit 19

The useful symbol period delay circuit 19 delays a cancel signal input from the interference wave cancel circuit 18 by a useful symbol period, and outputs the cancel signal delayed by the useful symbol period to the correlation detection circuit 20. Hereinafter, a cancel signal delayed by a useful symbol period, which is output from the useful symbol period delay circuit 19, is referred to as "delay signal".

Correlation Detection Circuit 20

The correlation detection circuit 20 multiplies the cancel signal input from the interference wave cancel circuit 18 by a complex conjugate of the delay signal input from the useful symbol period delay circuit 19 thereby to calculate a correlation value between the cancel signal and the delay signal. Then, the correlation detection circuit 20 calculates a moving average of each of an I component and a Q component of the correlation value using a width of a guard interval period, and outputs a correlation signal whose I component and Q component are respectively the moving average values of the I component and the Q component of the correlation value to the timing detection circuit 21 and the $\tan^{-1}$ circuit 22.

In this way, the correlation detection circuit 20 obtains the correlation signal using the cancel signal from which the narrow-band interference wave component has been adaptively canceled and the delay signal. Accordingly, even in a case where an OFDM signal having a narrow-band interference wave superposed thereon is received, the correlation signal output from the correlation detection circuit 20 include few components relating to the narrow-band interference wave.

Timing Detection Circuit 21

The timing detection circuit 21 monitors the correlation signal input from the correlation detection circuit 20 to detect a peak of the correlation signal, and detects a timing relating to a head of a useful symbol period of an IQ demodulated signal using the detected peak of the correlation signal. Then, the timing detection circuit 21 outputs a detection signal indicating the detected timing relating to the useful symbol period of the IQ demodulated signal to the FFT circuit 15 and the $\tan^{-1}$ circuit 22.

The timing detection circuit 21 uses the correlation signal obtained using the cancel signal and the delay signal from which the narrow-band interference wave components have been adaptively canceled respectively, in order to detect the timing relating to the head of the useful symbol period of the IQ demodulated signal. Accordingly, even in a case where an OFDM signal having a narrow-band interference wave superposed thereon is received, the timing detection circuit 21 can accurately detect the timing relating to the head of the useful symbol period of the IQ demodulated signal. In other words, the OFDM receiver 1 can accurately perform symbol synchronization for identifying a symbol.

Tan$^{-1}$ Circuit 22

Based on a detection signal input from the timing detection circuit 21, the tan$^{-1}$ circuit 22 detects a period of, a correlation signal input from the correlation detection circuit 20 that corresponds to a guard interval period of a delay signal. Hereinafter, the detected period of the correlation signal is referred to as "correlation signal guard interval period". The tan$^{-1}$ circuit 22 calculates, for each sample of a correlation signal in the detected correlation signal guard interval period, a phase angle tan$^{-1}$(Q/I) of the correlation signal using a value of an I component (hereinafter, "I") and a value of a Q component (hereinafter, "Q") of the correlation signal. Then, the tan$^{-1}$ circuit 22 outputs an error signal indicating the calculated phase angle tan$^{-1}$(Q/I) to the frequency control circuit 23.

However, if there is no frequency error between a frequency of an OFDM signal input to the IQ demodulation circuit 14 and a detection frequency of a detection signal to be used by the IQ demodulation circuit 14 for performing quasi-synchronous quadrature detection, a signal included in a latter part of the useful symbol period of a cancel signal matches a signal included in a delay signal in a guard signal. As a result, the phase angle tan$^{-1}$(Q/I) of the correlation signal is 0.

Compared with this, if there is a frequency error between the frequency of the input OFDM signal and the detection frequency, there is a phase difference, which corresponds to the frequency error, between the signal included in the latter part of the useful symbol period of the cancel signal and the signal included in the delay signal in the guard signal. As a result, the phase angle tan$^{-1}$(Q/I) of the correlation signal is a value proportional to the frequency error.

Frequency Control Circuit 23

The frequency control circuit 23 multiplies the phase angle tan$^{-1}$(Q/I) indicated by the error signal input from the tan$^{-1}$ circuit 22 by a gain coefficient, and integrates a value obtained as a result of the multiplication. Then, in order to match a detection frequency of a detection signal to be used by the IQ demodulation circuit 14 for performing quasi-synchronous quadrature detection with a frequency of an OFDM signal input to the IQ demodulation circuit 14, the frequency control circuit 23 generates a control signal for controlling the detection frequency of the detection signal based on a value obtained as a result of the integration, and outputs the generated control signal to the IQ demodulation circuit 14.

In order to control a detection frequency of a detection signal, the tan$^{-1}$ circuit 22 and the frequency control circuit 23 use a correlation signal, which has been calculated using a cancel signal and a delay signal from which narrow-band interference wave components have been adaptively canceled respectively. Accordingly, even if receiving an OFDM signal having a narrow-band interference wave component superposed thereon, the OFDM receiver 1 can adjust a detection frequency of a detection signal to a frequency of an OFDM signal input to the IQ modulation circuit 14. That is, the OFDM receiver 1 can accurately perform frequency synchronization.

<Structure of Interference Wave Cancel Circuit 18>

Figure 2:
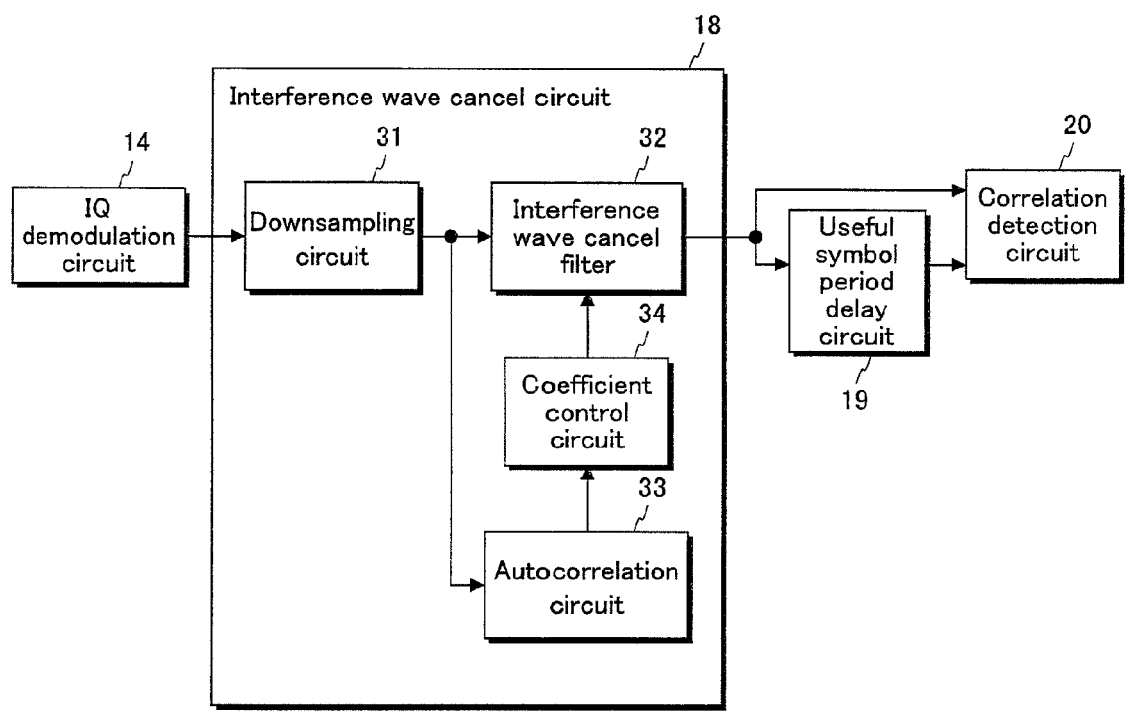
FIG. 2 shows the structure of an interference wave cancel circuit shown in FIG. 1.

The structure of the interference wave cancel circuit 18 shown in FIG. 1 is described with reference to FIG. 2. FIG. 2 shows the structure of the interference wave cancel circuit 18 shown in FIG. 1.

The interference wave cancel circuit 18 includes a downsampling circuit 31, an interference wave cancel filter 32, an autocorrelation circuit 33, and a coefficient control circuit 34.

Downsampling Circuit 31

An IQ demodulated signal output from the IQ demodulation circuit 14 is input to the downsampling circuit 31.

The downsampling circuit 31 performs band limitation on the IQ demodulated signal input from the IQ demodulation circuit 14, decreases a sampling frequency of a signal obtained as a result of the band limitation, and outputs a signal obtained as a result of the decrease of the sampling frequency to the interference wave cancel filter 32 and the autocorrelation circuit 33. Hereinafter, a signal obtained as a result of decrease of a sampling frequency output from the downsampling circuit 31 is referred to as "resampled signal".

Note that an IQ demodulated signal output from the IQ demodulation circuit 14 is generally sampled using a sampling frequency higher than a value of a frequency bandwidth of an OFDM signal. As a result, a protection band called a guard band is provided. This eliminates the influence of the aliasing distortion due to the sampling on an IQ demodulated signal.

Note that the downsampling circuit 31 preferably resamples an IQ demodulated signal using a sampling frequency no more than a value of a frequency bandwidth of an OFDM signal. This is because if a sampling frequency of a resampled signal is higher than a value of a frequency bandwidth of an OFDM signal, there is a possibility that, in processing for canceling a narrow-band interference wave component relating to a narrow-band interference wave from a resampled signal performed by the interference wave cancel film 32, the autocorrelation circuit 33, and the coefficient control circuit 34, a component relating to the OFDM signal transmitted from an OFDM transmitter might be mistaken for the narrow-band interference wave component.

Figure 3:
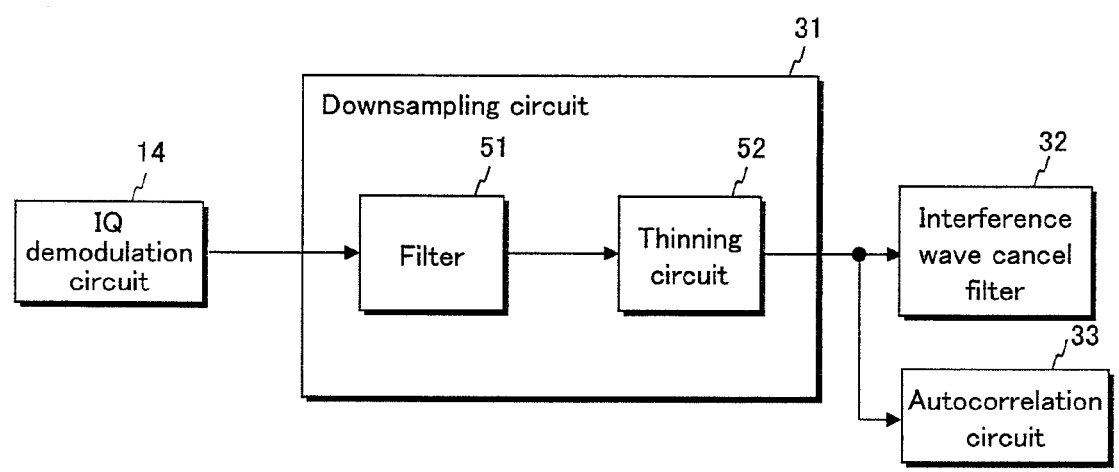
FIG. 3 shows the structure of a downsampling circuit shown in FIG. 2.

Furthermore, the downsampling circuit 31 is described with reference to FIG. 3. FIG. 3 is an example of the structure of the downsampling circuit 31 shown in FIG. 2, which includes a filter 51 and a thinning circuit 52.

Filter 51

An IQ demodulated signal output from the IQ demodulation circuit 14 is input to the filter 51.

The filter 51 has predetermined band-pass characteristics, performs band limitation on the IQ demodulated signal output from the IQ demodulation circuit 14 by filtering, and outputs a signal obtained as a result of the band limitation (hereinafter, "band limitation processing signal") to the thinning circuit 52.

Note that a cutoff frequency of the band-pass characteristics of the filter 51 is preferably a nyquist frequency of sampling frequencies of a resampled signal output from the thinning circuit 52 with respect to root nyquist characteristics. This is because a gain of a frequency band of the resampled signal is constant in consideration of the aliasing distortion due to the thinning of the sample of the band limitation processing signal performed by the thinning circuit 52.

Accordingly, in the first embodiment and a second embodiment described later, the filter 51 has the band-pass characteristics whose cutoff frequency in the root nyquist characteristics is the nyquist frequency of the sampling frequencies of the resampled signal output from the thinning circuit 52.

Note that the cutoff frequency of the band-pass characteristics of the filter 51 does not necessarily need to be the nyquist frequency of the sampling frequencies of the resampled signal output from the thinning circuit 52, with respect to the root nyquist characteristics.

Also, the band-pass characteristics of the filter 51 do not necessarily need to be the root nyquist characteristics.

Thinning Circuit 52

The thinning circuit 52 thins a sample of a band limitation processing signal input from the filter 51 thereby to convert the band limitation processing signal into a resampled signal whose sampling frequency is lower than that of the band limitation processing signal, and outputs the resampled signal to the interference wave cancel filter 32 and the autocorrelation circuit 33.

Note that the thinning unit 52 preferably thins the sample of the band limitation processing signal input from the filter 51 such that the sampling frequency of the resampled signal is no more than a value of a frequency bandwidth of the OFDM signal. The reason for this is as described in the explanation of the downsampling circuit 31.

Also, it is possible to simplify the structures of the filter 51 and the thinning circuit 52, by determining a ratio of sampling frequency between an IQ demodulated signal and a resampled signal to an integer.

Therefore, in the first and second embodiments, the thinning circuit 52 thins a sample of a band limitation processing signal such that a sampling frequency of a resampled signal is no more than a value of a frequency bandwidth of an OFDM signal and a ratio of sampling frequency between an IQ demodulated signal and the resampled signal is an integer.

The thinning circuit 52 does not necessarily need to thin a sample of a band limitation processing signal such that a sampling frequency of a resampled signal is no more than a value of a frequency bandwidth of an OFDM signal. Also, the thinning circuit 52 does not necessarily need to thin a sample of a band limitation processing signal such that a ratio of sampling frequency between an IQ demodulated signal and a resampled signal is an integer.

The downsampling circuit 31 described above aims to eliminate the time correlation in a short period of an OFDM signal transmitted by the OFDM transmitter included in a resampled signal.

Interference Wave Cancel Filter 32

The interference wave cancel filter 32 is a filter having a variable filter coefficient, and adaptively cancels a narrow-band interference wave component relating to a narrow-band interference wave included in a resampled signal input from the downsampling circuit 31. Then, the interference wave cancel filter 32 outputs a signal obtained as a result of the adaptive cancellation of the narrow-band interference wave component from the resampled signal, as a cancel signal, to the useful symbol period delay circuit 19 and the correlation detection circuit 20. Note that the filter coefficient of the interference wave cancel filter 32 is controlled by the coefficient control circuit 34.

Figure 4:
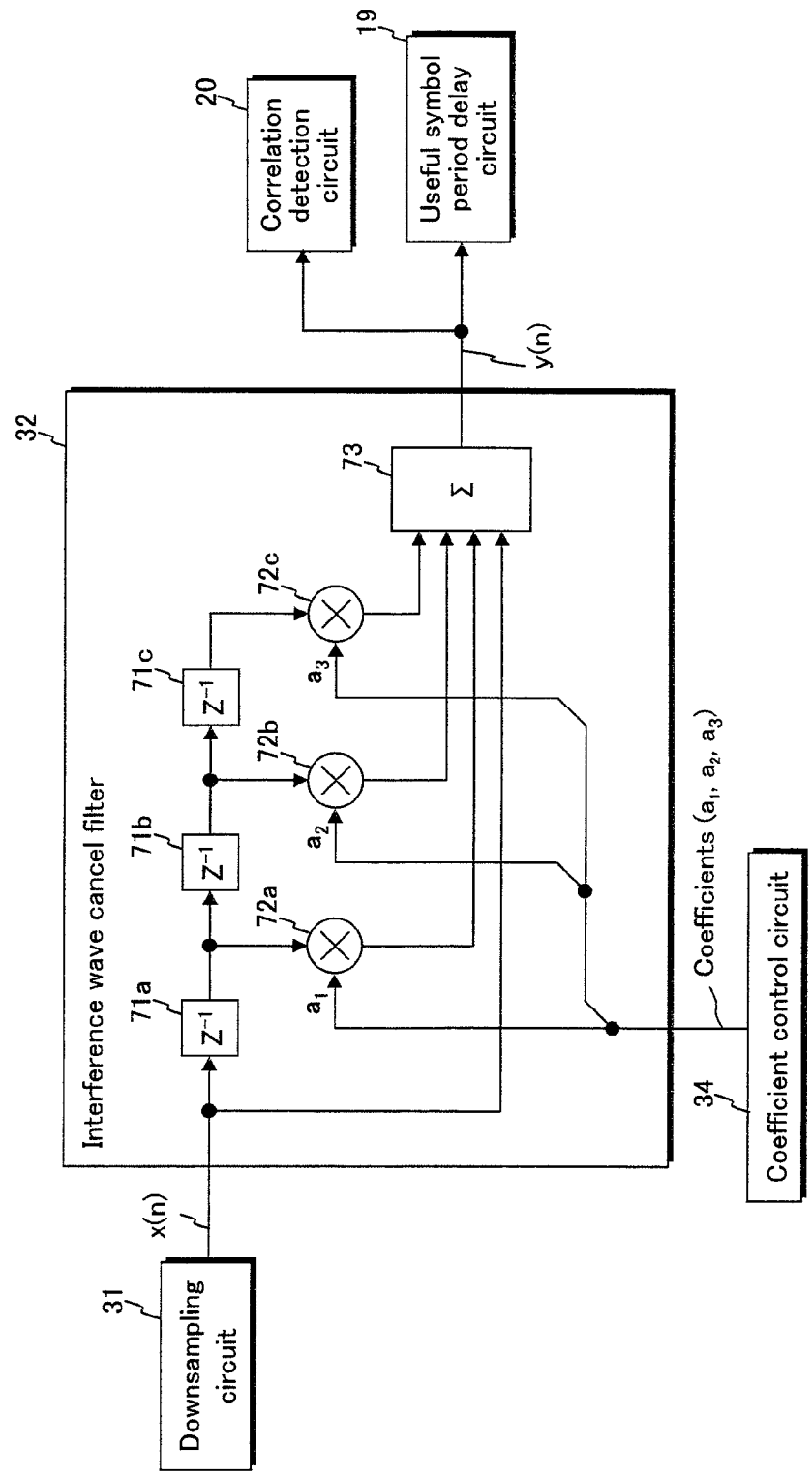
FIG. 4 shows the structure of an interference wave cancel filter shown in FIG. 2.

Furthermore, the interference wave cancel filter 32 is described with reference to FIG. 4. FIG. 4 shows a structure example of the interference wave cancel filter 32 shown in FIG. 2.

The interference wave cancel filter 32 is structured using a 4-tap FIR (Finite Impulse Response) filter, and includes delay circuits 71a, 71b, and 71c, multiplication circuits 72a, 72b, and 72c, and an addition circuit 73.

Here, a resampled signal output from the downsampling circuit 31 is defined as "x(n)", a cancel signal output from the interference wave cancel filter 32 is defined as "y(n)". "n" represents a sampling time, and "x(n)" and "y(n)" each represent a time function.

Delay Circuits 71a, 71b, and 71c

The delay circuits 71a, 71b, and 71c each subsequently delay input resampled signals sample by sample. At the sampling time n, the delay circuit 71a outputs a resampled signal x(n−1) that is one sample previous, and the delay circuit 71b outputs a resampled signal x(n−2) that is two samples previous, and the delay circuit 71c outputs a resampled signal x(n−3) that is three samples previous.

Multiplication Circuits 72a, 72b, and 72c

Filter coefficients $a_1$, $a_2$, and $a_3$ respectively corresponding to the multiplication circuits 72a, 72b, and 72c are controlled by the coefficient control circuit 34.

The multiplication circuits 72a, 72b, and 72c respectively multiply the resampled signals x(n−1), x(n−2), and x(n−3) respectively input from the delay circuits 71a, 71b, and 71c by the filter coefficients $a_1$, $a_2$, and $a_3$, and output results of the multiplications $a_1 x(n-1)$, $a_2 x(n-2)$, and $a_3 x(n-3)$ to the addition circuit 73.

Addition Circuit 73

The addition circuit 73 adds the resampled signal x(n) output from the downsampling circuit 31, the multiplication result $a_1 x(n-1)$ input from the multiplication circuit 72a, the multiplication result $a_2 x(n-2)$ input from the multiplication circuit 72b, and the multiplication result $a_3 x(n-3)$ input from the multiplication circuit 72c. Then, the addition circuit 73 outputs a result of the addition shown in the following (Formula 1), as a cancel signal y(n), to the useful symbol period delay circuit 19 and the correlation detection circuit 20.

$$y(n)=x(n)+a_1x(n-1)+a_2x(n-2)+a_3x(n-3) \quad \text{(Formula 1)}$$

The maximum number of notch in the band-pass characteristics of the FIR filter is equal to an order of the FIR filter. Accordingly, in order to efficiently cancel a narrow-band interference wave component relating to M narrow-band interference waves (M is an integer no less than 1) included in a resampled signal input to the interference wave cancel filter 32, the order of the FIR filter is preferably M or no less than (M+1). Therefore, the order of the FIR filter used as the interference wave cancel filter 32 may be determined based on the number of narrow-band interference waves a designer hopes to cancel.

Also, a frequency resolution of the band-pass characteristics of the FIR filter increases as the order of the FIR filter increases. Accordingly, the order of the FIR filter may be determined in consideration of a desired frequency resolution.

Autocorrelation Circuit 33

The autocorrelation circuit 33 calculates an autocorrelation value R(i) relating to autocorrelation of a resampled signal input from the downsampling circuit 31.

Specifically, when i is a negative integer, the autocorrelation circuit 33 calculates an autocorrelation value R(i) by performing a complex multiplication of a complex conjugate of a resampled signal x(n) and a resampled signal x(n+i) input from the downsampling circuit 31, as shown in the following (Formula 2).

Also, when i is an integer no less than 0, the autocorrelation circuit 33 calculates an autocorrelation value R(i) by performing a complex multiplication of a resampled signal x(n) and a complex conjugate of a resampled signal x(n−i), as shown in the following (Formula 3).

Note that, in the present embodiment, since the order of the FIR filter used as the interference wave cancel filter 32 is 3, i is an integer no less than −2 and no more than 3 (−2, −1, 0, 1, 2, or 3). When the order of the FIR filter used as the interference wave cancel filter 32 is k (k is an integer no less than 1), i is an integer no less than −k+1 and no more than k.

The autocorrelation circuit 33 outputs the calculated autocorrelation value R(i) (i is an integer no less than −2 and no more than 3) to the coefficient control circuit 34.

$$R(i)=E\{x(n+i)\cdot x^*(n)\} \text{ (}i \text{ is a negative integer)} \quad \text{(Formula 2)}$$

$$R(i)=E\{x(n)\cdot x^*(n-i)\} \text{ (}i \text{ is an integer no less than 0)} \quad \text{(Formula 3)}$$

Instead of calculating the autocorrelation values R(−1) and R(−2) using the above (Formula 2), the autocorrelation circuit 33 may calculate complex conjugates of the autocorrelation values R(1) and R(2), which have been calculated using the above (Formula 3), and use the calculated complex conjugates of the autocorrelation values R(1) and R(2) as the autocorrelation values R(−1) and R(−2). This can reduce the circuit size and the calculation amount of the autocorrelation circuit 33.

Coefficient Control Circuit 34

The coefficient control circuit 34 calculates control values of the filter coefficients $a_1$, $a_2$, and $a_3$ of the interference wave cancel filter 32 by performing a matrix calculation based on the following (Formula 4) using the autocorrelation value R(i) (i is an integer no less than −2 and no more than 3) input from the autocorrelation circuit 33. Then, the coefficient control circuit 34 controls the filter coefficients $a_1$, $a_2$, and $a_3$ of the interference wave cancel filter 32 such that the values of the filter coefficients $a_1$, $a_2$, and $a_3$ are equal to the corresponding calculated control values.

$$\begin{bmatrix} a_1 \\ a_2 \\ a_3 \end{bmatrix} = \begin{bmatrix} R(0) & R(-1) & R(-2) \\ R(1) & R(0) & R(-1) \\ R(2) & R(1) & R(0) \end{bmatrix}^{-1} \begin{bmatrix} R(1) \\ R(2) \\ R(3) \end{bmatrix} \quad \text{(Formula 4)}$$

In the (Formula 4), the sign [ ] indicates a matrix, and the sign [ ]$^{-1}$ indicates an inverse matrix of the matrix [ ].

The following describes the outline of derivation of the above (Formula 4).

The interference wave cancel filter 32 calculates an interference wave estimation signal $x_1(n)$ indicating an estimate value of a narrow-band interference wave based on the following (Formula 5), and subtracts the calculated interference wave estimation signal $x_1(n)$ from the input resampled signal $x(n)$, and outputs a cancel signal y(n).

$$x_1(n) = -a_1 x(n-1) - a_2 x(n-2) - a_3 x(n-3) \quad \text{(Formula 5)}$$

That is, the calculation relating to the interference wave cancel filter 32 based on the (Formula 1) is represented as the following (Formula 6).

$$y(n) = x(n) - x_1(n) \quad \text{(Formula 6)}$$

Here, the cancel signal y(n) can be regarded as an estimated error relating to the narrow-band interference wave. Accordingly, by determining the filter coefficients $a_1$, $a_2$, and $a_3$ of the interference wave cancel filter 32 such that a square mean value J of an estimated error shown in the following (Formula 7) is the smallest value, the narrow-band interference wave component relating to the narrow-band interference wave included in the cancel signal y(n) output from the interference wave cancel filter 32 is the smallest value.

$$J = E\{|y(n)|^2\} \quad \text{(Formula 7)}$$

In the above (Formula 7), the sign E{ } indicates a time average calculation.

The filter coefficients $a_1$, $a_2$, and $a_3$ corresponding to the smallest square mean value J of the estimated error can be calculated by solving a simultaneous equation in which equations obtained as a result of partial differentiation of the square mean value J of the estimated error by the coefficients $a_1$, $a_2$, and $a_3$ are respectively 0. This simultaneous equation is represented as the following (Formula 8)

$$\begin{bmatrix} R(0) & R(-1) & R(-2) \\ R(1) & R(0) & R(-1) \\ R(2) & R(1) & R(0) \end{bmatrix} \begin{bmatrix} a_1 \\ a_2 \\ a_3 \end{bmatrix} = \begin{bmatrix} R(1) \\ R(2) \\ R(3) \end{bmatrix} \quad \text{(Formula 8)}$$

In the (Formula 8), a bracket [ ] represents a matrix, R(i) (i is an integer no less than −2 and no more than 3) is an autocorrelation value of a resampled signal calculated by the autocorrelation circuit 33 using either of the above (Formula 2) and (Formula 3).

The above (Formula 4) can be derived by modifying the (Formula 8).

As described above, the interference wave cancel circuit 18 monitors an IQ demodulated signal input from the IQ demodulation circuit 14, and adaptively controls coefficients $a_1$, $a_2$, and $a_3$ of an interference wave cancel filter. This can minimize a narrow-band interference wave component relating to a narrow-band interference wave included in a cancel signal output from the interference wave cancel filter 32.

The interference wave cancel circuit 18 having the above described structure calculates control values of filter coefficients $a_1$, $a_2$, and $a_3$ of the interference wave cancel filter 32 based on a time correlation of a resampled signal at short time intervals such as some sample intervals, and controls the filter coefficients $a_1$, $a_2$, and $a_3$ of the interference wave cancel filter 32 based on the calculated control values. Accordingly, even if the amplitude and the phase of the narrow-band interference wave changes over time, it is possible to precisely cancel the narrow-band interference wave component relating to the narrow-band interference wave included in the resampled signal. Also, the filter coefficients $a_1$, $a_2$, and $a_3$ of the interference wave cancel filter 32 can promptly follow the time fluctuation of the amplitude and the phase of the narrow-band interference wave.

<Operations of Interference Wave Cancel Circuit 18>

The following describes an example of operations of the interference wave cancel circuit 18 whose structure has been described with reference to FIG. 2 to FIG. 4, with reference to FIG. 5 to FIG. 9. In FIG. 5 to FIG. 7 and FIG. 9, the horizontal axis represents frequency, and the vertical axis represents power density. Also, in FIG. 8, the horizontal axis represents frequency, and the vertical axis represents gain.

In the example of the operations, the OFDM receiver 1 receives OFDM signals compliant with the ISDB-T (Integrated Services Digital Broadcasting-Terrestrial) standard that is the digital terrestrial television system in Japan. A frequency bandwidth of the OFDM signals compliant with the ISDB-T standard is approximately 5.57 MHz.

Figure 5:
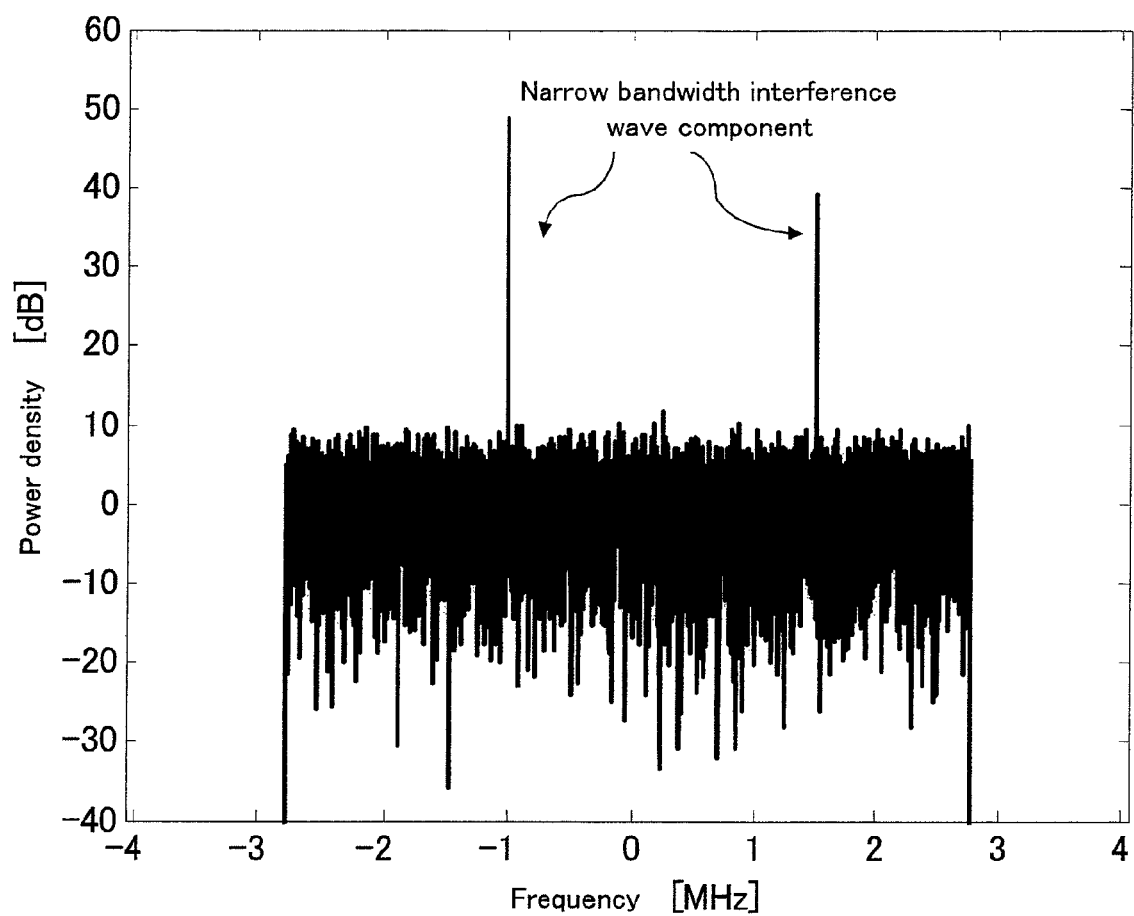
FIG. 5 shows an example of a frequency spectrum of a signal input to the interference wave cancel circuit shown in FIG. 2.

FIG. 5 shows an example of a frequency spectrum of an OFDM signal compliant with the ISDB-T system which has been sampled at approximately 8.13 MHz and converted into a complex baseband signal, that is, an IQ demodulated signal input to the interference wave cancel circuit 18.

In FIG. 5, bright line spectra at −1 MHz and 1.5 MHz relate to narrow-band interference waves respectively. The frequency spectrum shown in FIG. 5 shows that an IQ demodulated signal input to the interference wave cancel circuit 18 includes two narrow-band interference waves.

The IQ demodulated signal whose frequency spectrum is shown in FIG. 5 is input to the filter 51 of the downsampling circuit 31. Note that a Nyquist bandwidth of the filter 51 is assumed to be approximately 4.06 MHz that is half a sampling frequency of the IQ demodulated signal.

The filter 51 performs band limitation on the IQ demodulated signal by filtering. A band limitation processing signal whose frequency spectrum is shown in FIG. 6 is output from the filter 51.

Figure 6:
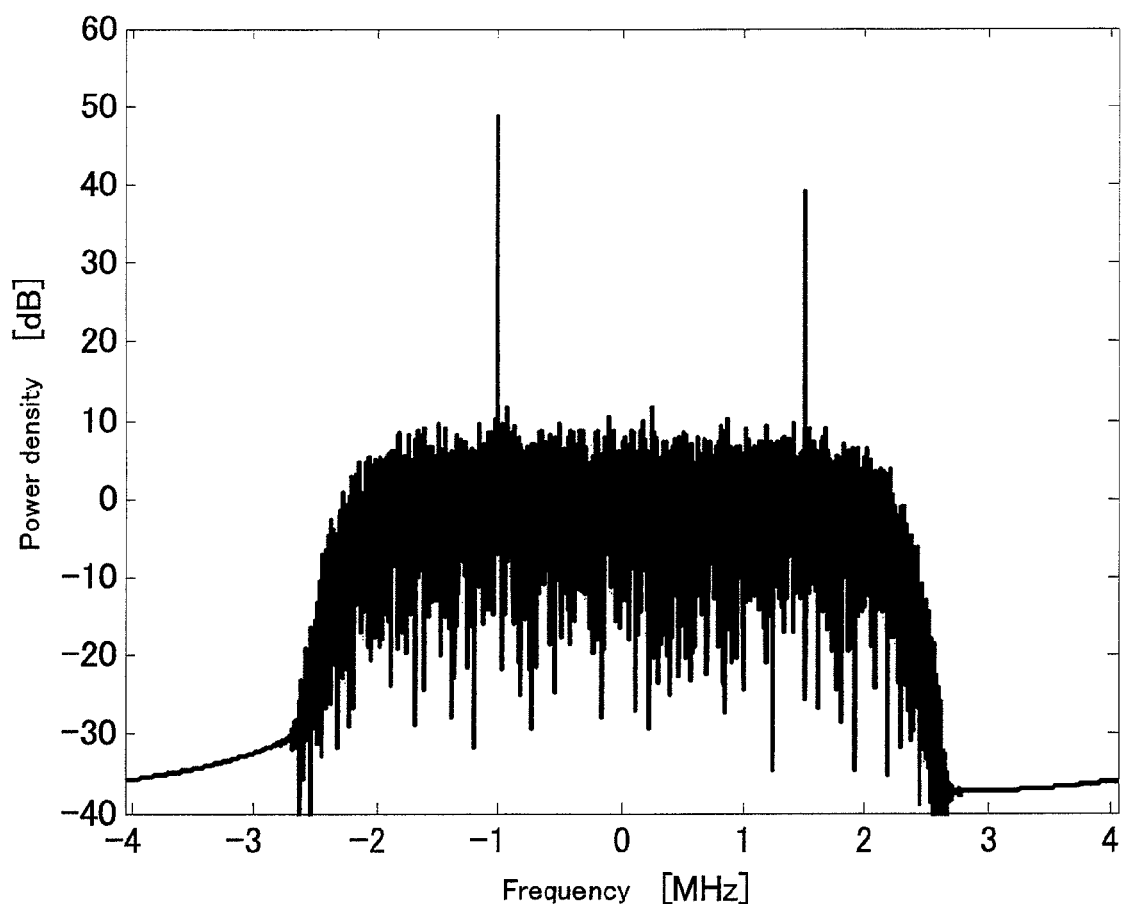
FIG. 6 shows an example of a frequency spectrum of a signal output from a filter shown in FIG. 3.
Figure 7:
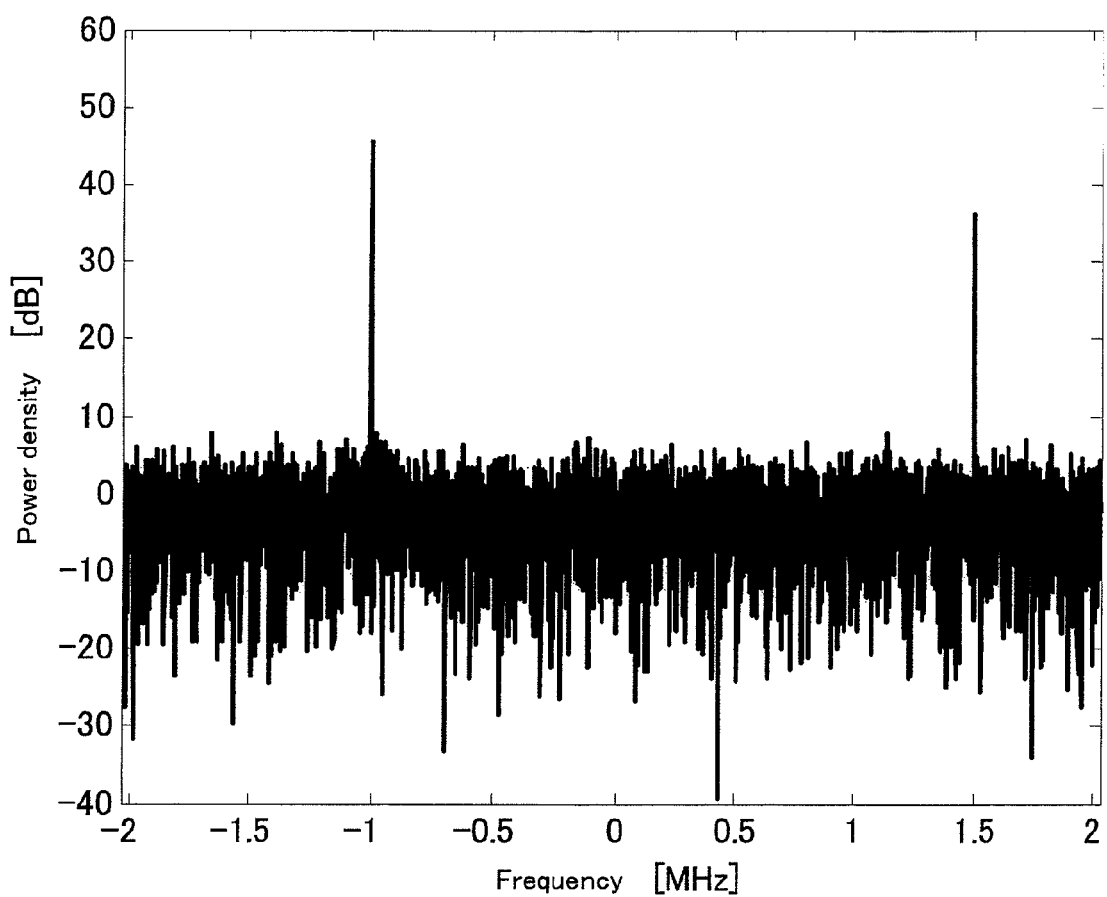
FIG. 7 shows an example of a frequency spectrum of a signal output from a thinning circuit shown in FIG. 3.

The band limitation processing signal whose frequency spectrum is shown in FIG. 6 output from the filter 51 is thinned by the thinning circuit 52 such that the number of samples of the band limitation processing signal is half the original number. Then, a resampled signal whose frequency spectrum is shown in FIG. 7 is output from the thinning circuit 52. That is, the thinning circuit 52 thins samples of the band limitation processing signal such that the sampling frequency of the resampled signal is approximately 4.06 MHz.

The resampled signal whose frequency spectrum shown in FIG. 7 output from the thinning circuit 52 is input to the interference wave cancel filter 32 and the autocorrelation circuit 33.

The autocorrelation circuit 33 and the coefficient control circuit 34 each perform processing for controlling the filter coefficients $a_1$, $a_2$, and $a_3$ of the interference wave cancel filter 32. Then, the coefficient control circuit 34 supplies values of the filter coefficients $a_1$, $a_2$, and $a_3$ to the interference wave cancel filter 32.

Figure 8:
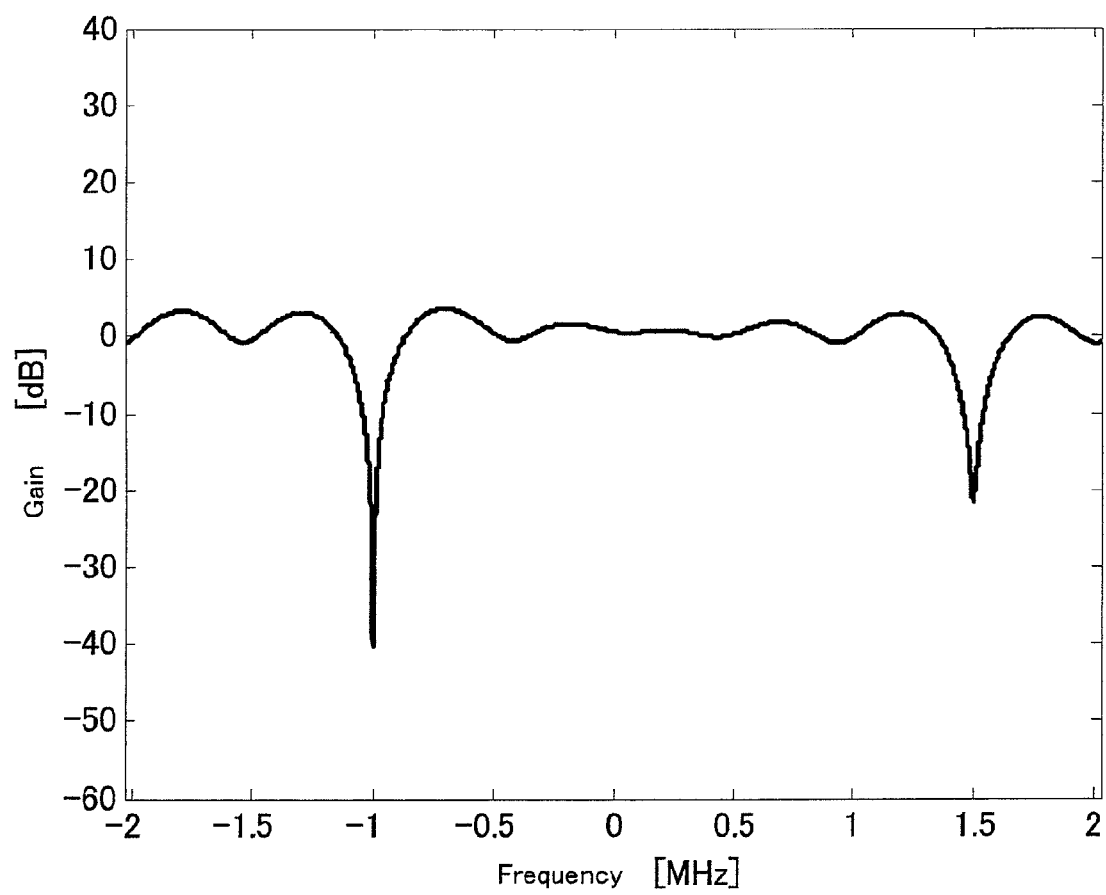
FIG. 8 shows an example of band-pass characteristics of an interference wave cancel filter shown in FIG. 2.

The interference wave cancel filter 32 shown in FIG. 4 is a 4-tap FIR filter. If an FIR filter having 10 taps is used here as the interference wave cancel filter 32, the band-pass characteristics of the interference wave cancel filter 32 are the frequency characteristics shown in FIG. 8. FIG. 8 shows that there are notches at −1 MHz and 1.5 MHz where there is a narrow-band interference wave, in other words, that there is little gain at −1 MHz and 1.5 MHz.

Figure 9:
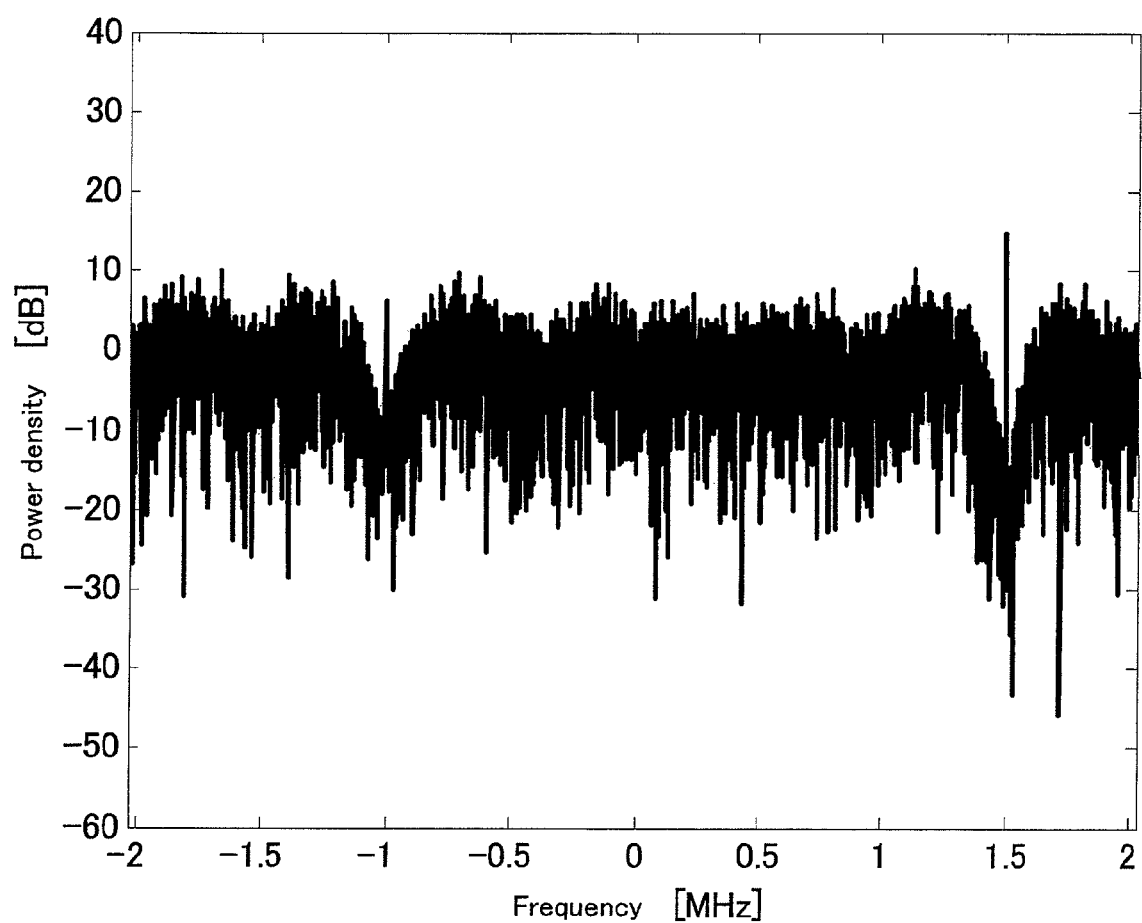
FIG. 9 shows an example of a frequency spectrum of a signal output from the interference wave cancel filter shown in FIG. 2.

The resampled signal whose frequency spectrum is shown in FIG. 7 output from the thinning circuit 52 is input to the interference wave cancel filter 32, and filtered by the interference wave cancel filter 32 having the band-pass characteristics shown in FIG. 8. Then, a cancel signal whose frequency spectrum is shown in FIG. 9 is output from the interference wave cancel filter 32. FIG. 9 shows that narrow-band interference wave components relating to a narrow-band interference wave at −1 MHz and 1.5 MHz are suppressed.

<Operations of OFDM Receiver>

The following describes the outline of receiving operations performed by the OFDM receiver 1 shown in FIG. 1.

The receiving operations performed by the OFDM receiver 1 is separately described here, as operations relating to receiving processing except processing relating to symbol synchronization and frequency synchronization (hereinafter, "demodulation operations") and operations relating to symbol synchronization and frequency synchronization (hereinafter, "synchronization operations").

Demodulation Operations of OFDM Receiver

OFDM signals received by the antenna 11 are input to the tuner 12. The tuner 12 selects an OFDM signal of a desired channel among the input OFDM signals, converts the selected OFDM signal into an OFDM signal of an IF band, and outputs the OFDM signal of the IF band to the A/D convertor 13.

The OFDM signal output from the tuner 12 is input to the A/D convertor 13. The A/D convertor 13 converts the input OFDM signal from an analog signal into a digital signal, and outputs the OFDM signal that has been converted into the digital signal.

The OFDM signal output from the A/D convertor 13 is input to the IQ demodulation circuit 14. Quasi-synchronous quadrature detection is performed on the OFDM signal by the IQ demodulation circuit 14, and a complex baseband signal (IQ demodulated signal) is output from the IQ demodulation circuit 14. Note that a detection frequency of a detection signal to be used by the IQ demodulation circuit 14 for performing quasi-synchronous quadrature detection is controlled so as to be equal to a frequency of an OFDM signal input to the IQ demodulation circuit 14 in the synchronization operation described later.

The IQ demodulated signal output from the IQ demodulation circuit 14 is input to the FFT circuit 15. As a result of an FFT calculation performed by the FFT circuit 15, the IQ demodulated signal is converted from data on a time axis into data a frequency axis, and a plurality of pieces of data respectively relating to a plurality of carriers are output from the FFT circuit 15. Note that the FFT circuit 15 detects a useful symbol period of the IQ demodulated signal based on a detection signal input from the timing detection circuit 21 in the synchronization operations described later, and performs an FFT calculation on the IQ demodulated signal of the detected useful symbol period.

The pieces of data respectively relating to the carriers output from the FFT circuit 15 are input to the demodulation circuit 16, and demodulated by the demodulation circuit 16. The demodulated data is output from the demodulation circuit 16.

Error correction processing is performed on the demodulated data output from the demodulation circuit 16 by the error correction circuit 17, and then received data is output from the error correction circuit 17.

Synchronization Operations of OFDM Receiver

In the above demodulation processing performed by the OFDM receiver 1, the IQ demodulated signal output from the IQ demodulation circuit 14 is also input to the interference wave cancel circuit 18.

The interference wave cancel circuit 18 performs processing as an operation example on the IQ demodulated signal input from the IQ demodulation circuit 14 with reference to FIG. 5 to FIG. 9, and outputs a cancel signal.

The cancel signal output from the interference wave cancel circuit 18 is input to the correlation detection circuit 20. After the cancel signal is delayed by the useful symbol period delay circuit 19 by the useful symbol period, a delay signal delayed by the useful symbol period is also input to correlation detection circuit 20.

Correlation between the cancel signal output from the interference wave cancel circuit 18 and the delay signal output from the useful symbol period delay circuit 19 is calculated by the correlation detection circuit 20, and a correlation signal relating to the calculated correlation is output from the correlation detection circuit 20.

The correlation signal output from the correlation detection circuit 20 is input to the timing detection circuit 21. The timing detection circuit 21 detects a timing relating to a head of the useful symbol period of the IQ demodulated signal biased on the correlation signal, and outputs a detection signal relating to a result of the detection to the FFT circuit 15 and the $\tan^{-1}$ circuit 22. Based on this detection signal, the FFT circuit 15 detects a useful symbol period of the IQ demodulated signal, and performs an FFT calculation on the IQ demodulated signal of the useful symbol period.

The correlation signal output from the correlation detection circuit 20 is input to the $\tan^{-1}$ circuit 22. The detection signal output from the timing detection circuit 21 is input to the $\tan^{-1}$ circuit 22.

The $\tan^{-1}$ circuit 22 detects a correlation signal guard interval period of the correlation signal input from the correlation circuit 20 based on the detection signal, and calculates a phase angle of the correlation signal of the detected correlation signal guard interval period, and outputs an error signal indicating the calculated value of the phase angle of the correlation signal to the frequency control circuit 23. The frequency control circuit 23 generates a control signal for controlling a detection frequency of the IQ demodulation circuit 14 based on the error signal output from the $\tan^{-1}$ circuit 22 so as to synchronize frequencies, and outputs the generated control signal to the IQ demodulation circuit 14. The IQ demodulation circuit 14 performs adjustment based on the control signal such that a detection frequency of the detection signal is equal to a frequency of the input OFDM signal.

Second Embodiment

The following describes the second embodiment of the present invention with reference to the drawings.

An OFDM receiver according to the second embodiment includes an interference wave cancel circuit 18a that is different from the interference wave cancel circuit 18 included in the OFDM receiver 1 according to the first embodiment.

In the second embodiment, it is possible to use the compositional elements of the OFDM receiver corresponding to those of the OFDM receiver 1 of the first embodiment, except for the interference wave cancel circuit 18a.

In the second embodiment, only the interference wave cancel circuit 18a is described.

Interference Wave Cancel Circuit 18a

Figure 10:
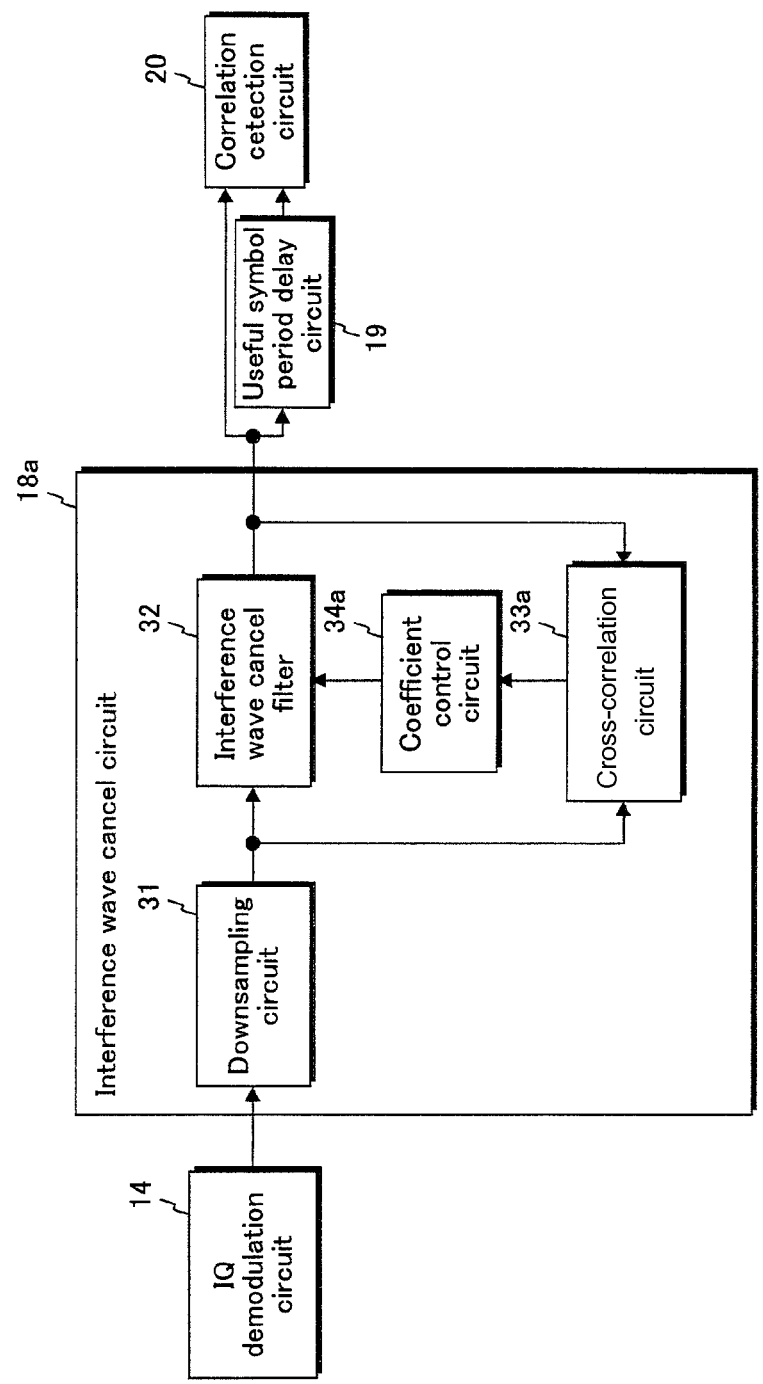
FIG. 10 shows the structure of an interference wave cancel circuit according to a second embodiment.
Figure 11:
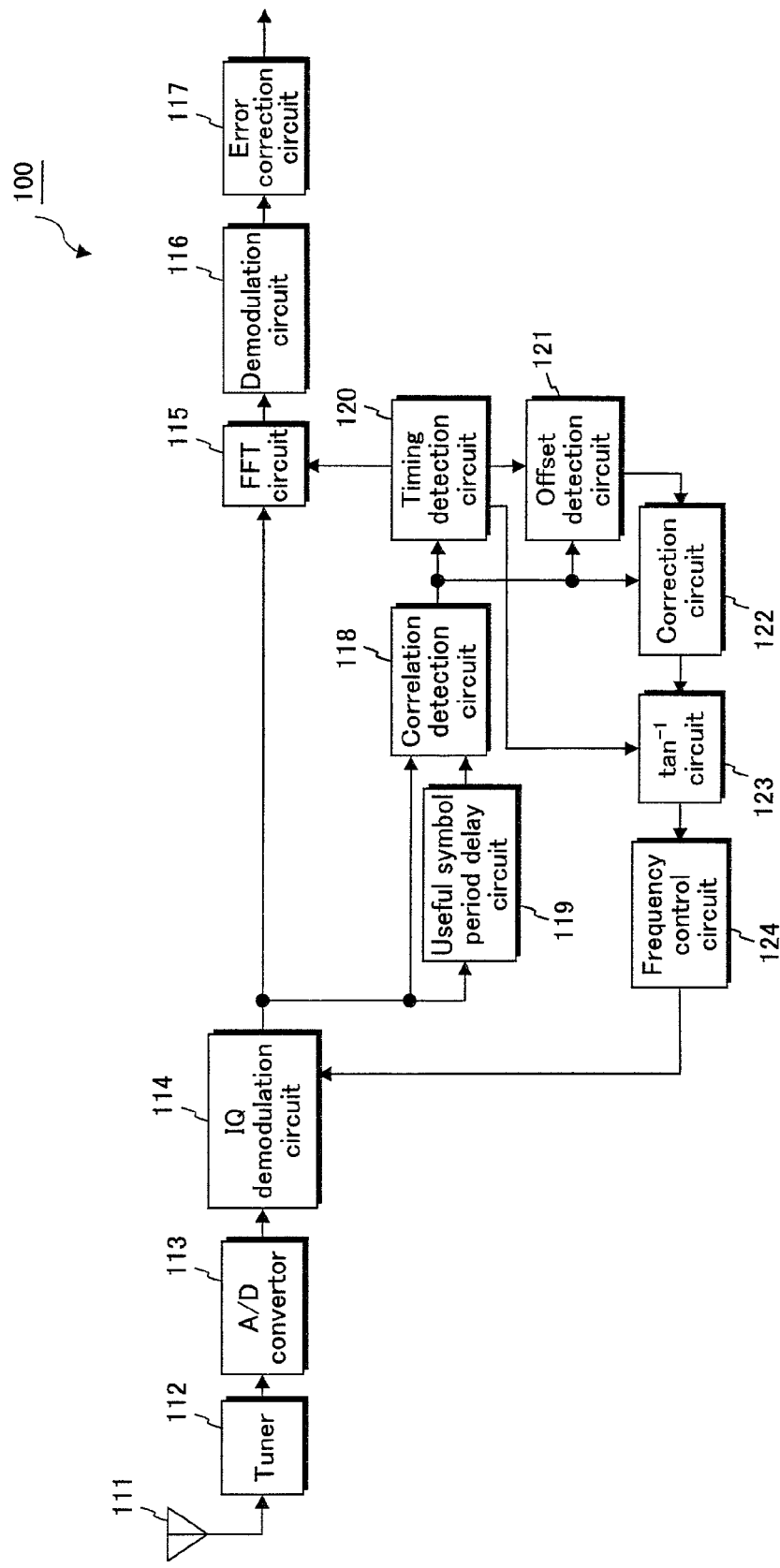
FIG. 11 shows the structure of a conventional OFDM signal receiver.
Figure 12:
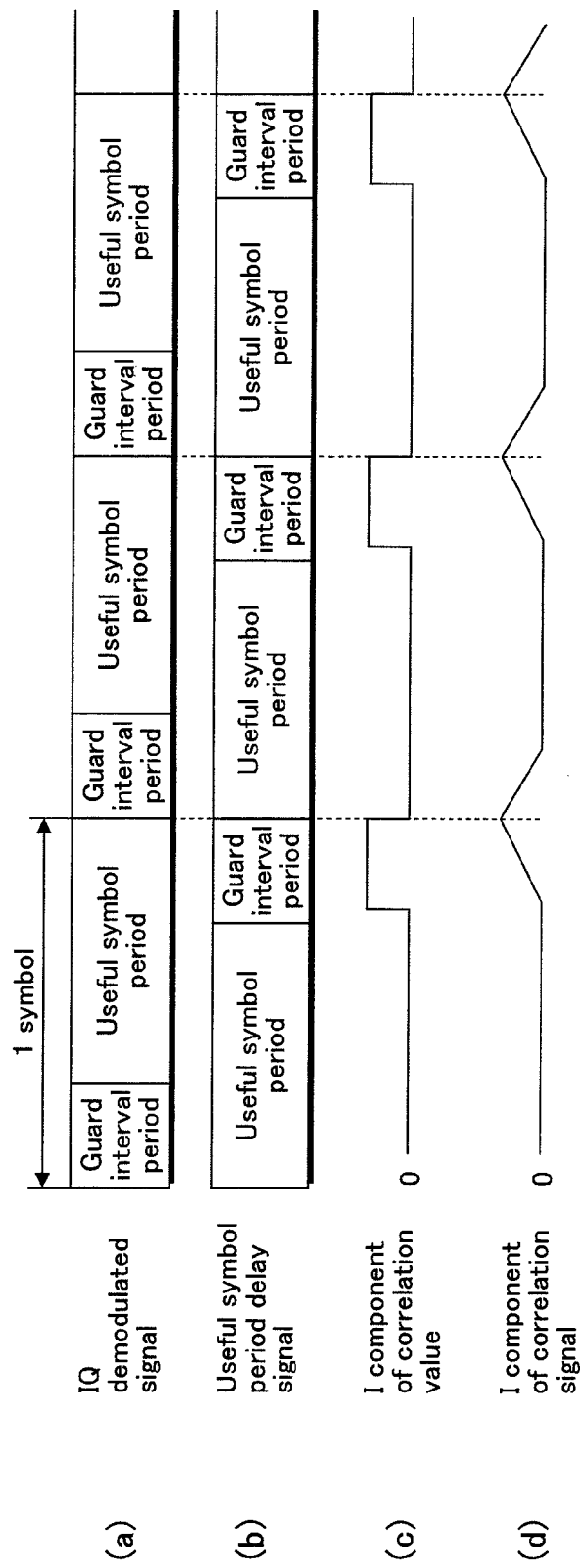
FIG. 12 shows operations of a correlation detection circuit shown in FIG. 11.
Figure 13:
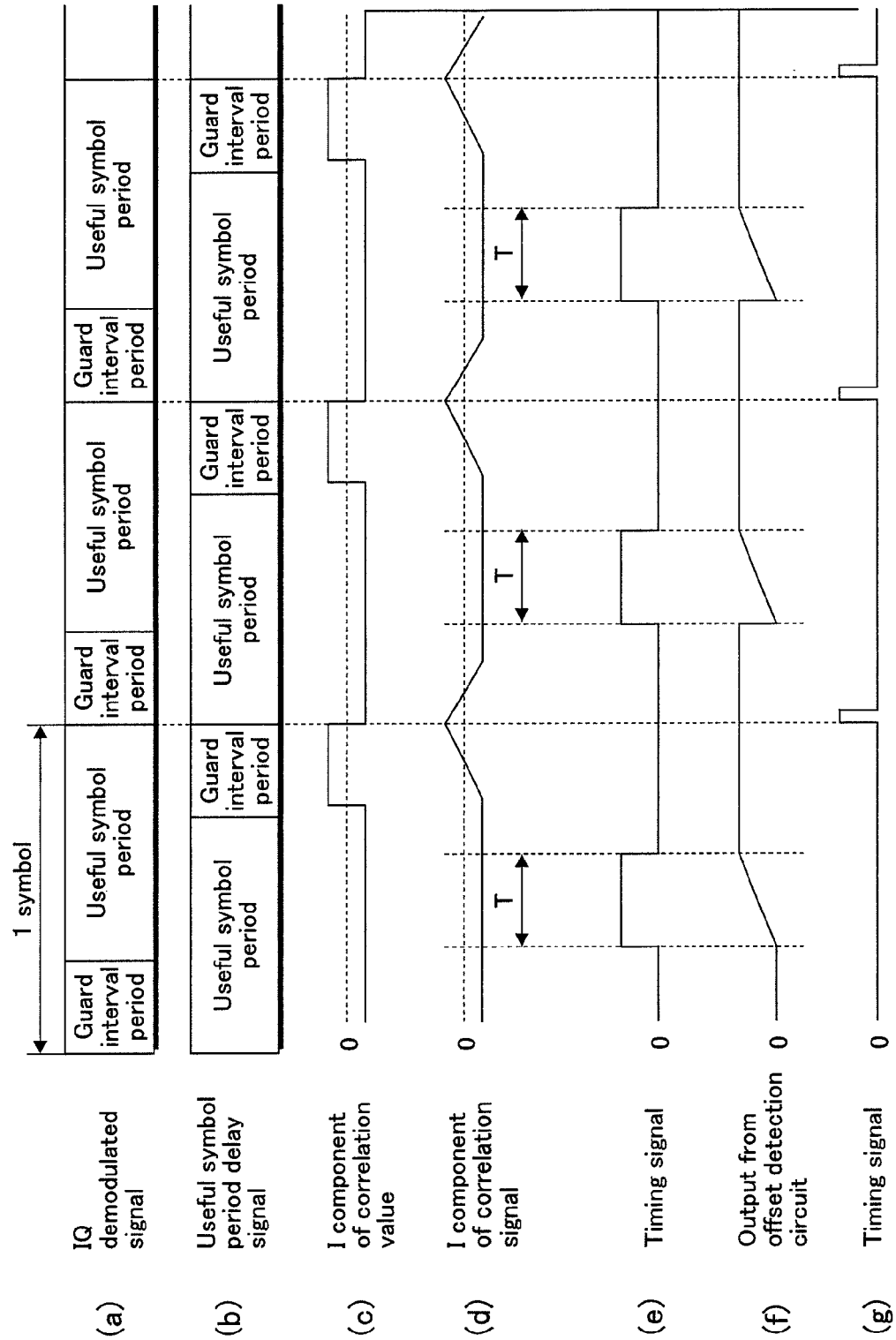
FIG. 13 shows operations in a case where an interference wave is superposed on an OFDM signal of the OFDM signal receiver shown in FIG. 11.

The structure of the interference wave cancel circuit 18a according to the second embodiment is described with reference to FIG. 10. FIG. 10 shows the structure of the interference wave cancel circuit 18a according to the second embodiment. Note that the compositional elements of the second embodiments that are substantially the same as those of the first embodiment have the same reference numbers. Since the descriptions shown in the first embodiment are applicable to the compositional elements of the second embodiment, the descriptions are omitted in the second embodiment.

The interference wave cancel circuit 18a includes a downsampling circuit 31, an interference wave cancel filter 32, a cross-correlation circuit 33a, and a coefficient control circuit 34a. Note that the cancel signal output from the interference wave cancel filter 32 is input to the useful symbol period delay circuit 19 and the correlation detection circuit 20, and is further input to the cross-correlation circuit 33a.

Cross-Correlation Circuit 33a

The cross-correlation circuit 33a calculates a cross-correlation between a resampled signal input from the downsampling circuit 31 and a cancel signal input from the interference wave cancel filter 32, and outputs the calculated value of the cross-correlation to the coefficient control circuit 34a.

Coefficient Control Circuit 34a

The coefficient control circuit 34a calculates control values of the filter coefficients $a_1$, $a_2$, and $a_3$ based on the value of the cross-correlation input from the cross-correlation circuit 33a. Then, the coefficient control circuit 34a controls the filter coefficients $a_1$, $a_2$, and $a_3$ of the interference wave cancel filter 32 such that the values of the filter coefficients $a_1$, $a_2$, and $a_3$ are equal to the corresponding calculated control values.

The coefficient control circuit 34a calculates the control values of the filter coefficients $a_1$, $a_2$, and $a_3$ of the interference wave cancel filter 32 with use of a convergence algorithm such as an LMS (Least Mean Square) algorithm and an RLS (Recursive Least Square) algorithm. The coefficient control circuit 34a sequentially updates the values of the filter coefficients $a_1$, $a_2$, and $a_3$ of the interference wave cancel filter 32. Note that the LMS algorithm and the RLS algorithm are each a known convergence algorithm, and therefore the detail description thereof is omitted here.

As described above, the interference wave cancel circuit 18a monitors an IQ demodulated signal input from the IQ demodulation circuit 14, and adaptively controls the coefficients $a_1$, $a_2$, and $a_3$ of the interference wave cancel filter thereby to minimize a narrow-band interference wave component included in a cancel signal output from the interference wave cancel filter 32.

The coefficient control circuit 34a can reduce at least one of the calculation amount and the circuit size with use of the convergence algorithm, compared with the coefficient control circuit 34 of the first embodiment.

<Supplementary Explanation>

While the present invention has been described based on the above embodiments, the present invention is of course not limited to these embodiments. The present invention also includes the following cases.

(1) In the first and second embodiments, the interference wave cancel filter 32 is structured using an FIR filter. The present invention is not limited to this. Alternatively, the interference wave cancel filter 32 may be any filter whose band-pass characteristics are changeable depending on filter coefficient. For example, an IIR (Infinite Impulse Response) filter may be employed.

(2) The OFDM receivers according to the first and second embodiments may be typically realized by an LSI (Large Scale Integration) that is an integrated circuit. The compositional elements of each of the receivers may be separately integrated into one chip, or integrated into one chip including part or all of the compositional elements.

Here, the LSI may be called an IC (Integrated Circuit), a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

INDUSTRIAL APPLICABILITY

The present invention is available for an OFDM receiver for receiving an OFDM signal including a useful symbol period for transmitting a signal relating to data and a guard interval period for transmitting a signal that is the same as part of the signal transmitted in the useful symbol period, and performing synchronization processing based on correlation between the OFDM signal and a delay signal that is generated by delaying the OFDM signal by the useful symbol period.

The invention claimed is:

1. An OFDM (Orthogonal Frequency Division Multiplexing) receiver for receiving an OFDM signal comprising a useful symbol period for transmitting a signal relating to data and a guard interval period for transmitting a signal that is the same as part of the signal transmitted in the useful symbol period, the OFDM receiver comprising:

an interference wave cancel unit operable to cancel a narrow-band interference wave component relating to a narrow-band interference wave from an input OFDM signal, and output the OFDM signal from which the narrow-band interference wave component has been cancelled, as a cancel signal;

a delay unit operable to delay the cancel signal output from the interference wave cancel unit by the useful symbol period, and output the delayed cancel signal, as a delay signal;

a correlation detection unit operable to calculate a correlation between the cancel signal output from the interference wave cancel unit and the delay signal output from the delay unit, and output a correlation signal relating to the calculated correlation; and a timing detection unit operable to perform symbol synchronization processing based on the correlation signal output from the correlation detection unit;

wherein the interference wave cancel unit controls a filter coefficient based on an autocorrelation of the input OFDM signal, and cancels the interference wave component by performing filtering based on the controlled filter coefficient, wherein the interference wave cancel unit includes a downsampling subunit operable to resample the input OFDM signal by decreasing a sampling frequency of the input OFDM signal, and output the resampled OFDM signal, as a resampled signal, wherein the interference wave cancel unit performs, on the resampled signal, processing for cancelling the narrow-band interference wave component, wherein the interference wave cancel unit performs processing for calculating the autocorrelation with use of the resampled signal, and wherein the downsampling subunit performs the resampling such that the sampling frequency of the resampled signal is less than a value of a frequency bandwidth of the input OFDM signal.

2. The OFDM receiver of claim 1, wherein the downsampling subunit includes:

a band limit filter subunit operable to perform band limitation on the input OFDM signal; and a thinning subunit operable to thin a sample included in the OFDM signal on which the band limitation has been performed by the band limit filter subunit, and output the OFDM signal from which the sample has been thinned, as the resampled signal.

3. The OFDM receiver of claim 2, wherein band-pass characteristics of the band limit filter subunit are determined such that a cutoff frequency of the band-pass characteristics is equal to a nyquist frequency of sampling frequencies of the resampled signal with respect to root nyquist characteristics.

4. The OFDM receiver of claim 2, wherein the thinning subunit performs the thinning such that the sampling frequency of the resampled signal is less than a value of a frequency bandwidth of the input OFDM signal.

5. An OFDM (Orthogonal Frequency Division Multiplexing) receiver for receiving an OFDM signal comprising a useful symbol period for transmitting a signal relating to data and a guard interval period for transmitting a signal that is the same as part of the signal transmitted in the useful symbol period, the OFDM receiver comprising:

an interference wave cancel unit operable to cancel a narrow-band interference wave component relating to a narrow-band interference wave from an input OFDM signal, and output the OFDM signal from which the narrow-band interference wave component has been cancelled, as a cancel signal;

a delay unit operable to delay the cancel signal output from the interference wave cancel unit by the useful symbol period, and output the delayed cancel signal, as a delay signal;

a correlation detection unit operable to calculate a correlation between the cancel signal output from the interference wave cancel unit and the delay signal output from the delay unit, and output a correlation signal relating to the calculated correlation; and a timing detection unit operable to perform symbol synchronization processing based on the correlation signal output from the correlation detection unit; and a $\tan^{-1}$ unit and a frequency control unit operable to perform frequency synchronization processing based on the correlation signal output from the correlation detection unit, wherein the interference wave cancel unit controls a filter coefficient based on a cross-correlation between the input OFDM signal and the cancel signal, and cancels the interference wave component by performing filtering based on the controlled filter coefficient, wherein the interference wave cancel unit includes a downsampling subunit operable to resample the input OFDM signal by decreasing a sampling frequency of the input OFDM signal, and output the resampled OFDM signal, as a resampled signal, wherein the interference wave cancel unit performs, on the resampled signal, processing for cancelling the narrow-band interference wave component, wherein the interference wave cancel unit performs processing for calculating the cross-correlation with use of the resampled signal and the cancel signal, and wherein the downsampling subunit performs the resampling such that the sampling frequency of the resampled signal is less than a value of a frequency bandwidth of the input OFDM signal.

6. The OFDM receiver of claim 5, wherein the downsampling subunit includes:

a band limit filter subunit operable to perform band limitation on the input OFDM signal; and a thinning subunit operable to thin a sample included in the OFDM signal on which the band limitation has been performed by the band limit filter subunit, and output the OFDM signal from which the sample has been thinned, as the resampled signal.

7. The OFDM receiver of claim 6, wherein band-pass characteristics of the band limit filter subunit are determined such that a cutoff frequency of the band-pass characteristics is equal to a nyquist frequency of sampling frequencies of the resampled signal with respect to root nyquist characteristics.

8. The OFDM receiver of claim 6, wherein the thinning subunit performs the thinning such that the sampling frequency of the resampled signal is less than a value of a frequency bandwidth of the input OFDM signal.

9. An OFDM (Orthogonal Frequency Division Multiplexing) receiver for receiving an OFDM signal comprising a useful symbol period for transmitting a signal relating to data and a guard interval period for transmitting a signal that is the same as part of the signal transmitted in the useful symbol period, the OFDM receiver comprising:

an interference wave cancel unit operable to cancel a narrow-band interference wave component relating to a narrow-band interference wave from an input OFDM signal, and output the OFDM signal from which the narrow-band interference wave component has been cancelled, as a cancel signal;

a delay unit operable to delay the cancel signal output from the interference wave cancel unit by the useful symbol period, and output the delayed cancel signal, as a delay signal;

a correlation detection unit operable to calculate a correlation between the cancel signal output from the interference wave cancel unit and the delay signal output from the delay unit, and output a correlation signal relating to the calculated correlation; and a $\tan^{-1}$ unit and a frequency control unit operable to perform frequency synchronization processing based on the correlation signal output from the correlation detection unit, wherein the interference wave cancel unit controls a filter coefficient based on an autocorrelation of the input OFDM signal, and cancels the interference wave component by performing filtering based on the controlled filter coefficient, wherein the interference wave cancel unit includes a downsampling subunit operable to resample the input OFDM signal by decreasing a sampling frequency of the input OFDM signal, and output the resampled OFDM signal, as a resampled signal, wherein the interference wave cancel unit performs, on the resampled signal, processing for cancelling the narrow-band interference wave component, wherein the interference wave cancel unit performs processing for calculating the autocorrelation with use of the resampled signal, and wherein the downsampling subunit performs the resampling such that the sampling frequency of the resampled signal is less than a value of a frequency bandwidth of the input OFDM signal.

10. An OFDM (Orthogonal Frequency Division Multiplexing) receiver for receiving an OFDM signal comprising a useful symbol period for transmitting a signal relating to data and a guard interval period for transmitting a signal that is the same as part of the signal transmitted in the useful symbol period, the OFDM receiver comprising:

an interference wave cancel unit operable to cancel a narrow-band interference wave component relating to a narrow-band interference wave from an input OFDM signal, and output the OFDM signal from which the narrow-band interference wave component has been cancelled, as a cancel signal;

a delay unit operable to delay the cancel signal output from the interference wave cancel unit by the useful symbol period, and output the delayed cancel signal, as a delay signal;

a correlation detection unit operable to calculate a correlation between the cancel signal output from the interference wave cancel unit and the delay signal output from the delay unit, and output a correlation signal relating to the calculated correlation; and a $\tan^{-1}$ unit and a frequency control unit operable to perform frequency synchronization processing based on the correlation signal output from the correlation detection unit, wherein the interference wave cancel unit controls a filter coefficient based on a cross-correlation between the input OFDM signal and the cancel signal, and cancels the interference wave component by performing filtering based on the controlled filter coefficient, wherein the interference wave cancel unit includes a downsampling subunit operable to resample the input OFDM signal by decreasing a sampling frequency of the input OFDM signal, and output the resampled OFDM signal, as a resampled signal, wherein the interference wave cancel unit performs, on the resampled signal, processing for cancelling the narrow-band interference wave component, wherein the interference wave cancel unit performs processing for calculating the cross-correlation with use of the resampled signal and the cancel signal, and wherein the downsampling subunit performs the resampling such that the sampling frequency of the resampled signal is less than a value of a frequency bandwidth of the input OFDM signal.

* * * * *